US012220657B2

(12) United States Patent
Whitlock et al.

(10) Patent No.: US 12,220,657 B2
(45) Date of Patent: Feb. 11, 2025

(54) FILTER DISK SEGMENTS

(71) Applicant: Pall Corporation, Port Washington, NY (US)

(72) Inventors: Michael B. Whitlock, Cortland, NY (US); Lara C. Heberle, Cortland, NY (US); Samantha M. Brand, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 181 days.

(21) Appl. No.: 17/246,349

(22) Filed: Apr. 30, 2021

(65) Prior Publication Data

US 2022/0347603 A1 Nov. 3, 2022

(51) Int. Cl.
*B01D 29/41* (2006.01)

(52) U.S. Cl.
CPC .................... *B01D 29/41* (2013.01)

(58) Field of Classification Search
None
See application file for complete search history.

(56) References Cited

U.S. PATENT DOCUMENTS

| | | | | |
|---|---|---|---|---|
| 515,894 A * | 3/1894 | Balz | ....................... | B01D 29/46 100/297 |
| 618,965 A * | 2/1899 | Theurer | ................. | B01D 29/46 210/488 |
| 630,363 A * | 8/1899 | Krause | ................... | B01D 21/26 210/489 |
| 837,845 A * | 12/1906 | Kiefer | .................... | B01D 29/58 210/488 |
| 915,650 A * | 3/1909 | Anderson | .............. | B01D 35/18 210/186 |
| RE13,053 E * | 12/1909 | Paul | ............................. | 210/344 |
| 1,036,174 A * | 8/1912 | Barnes | ................... | B01D 33/23 210/331 |
| 1,227,983 A * | 5/1917 | Vallez | ................ | B01D 17/0214 210/90 |
| 1,350,433 A * | 8/1920 | Atkins | ................... | B01D 35/12 210/327 |
| 1,944,550 A * | 1/1934 | Ericson | .................. | B01D 29/15 210/347 |
| 1,989,795 A * | 2/1935 | Fellows | ................. | B01D 29/41 29/896.62 |
| 2,053,856 A * | 9/1936 | Weidenbacker | ....... | B01D 35/14 494/84 |

(Continued)

FOREIGN PATENT DOCUMENTS

| CN | 204699494 U | 10/2015 |
|---|---|---|
| DE | 32 39 687 A1 | 5/1984 |

(Continued)

OTHER PUBLICATIONS

Japanese Patent Office, Office Action issued in Japanese Patent Application No. 2022-065832, mailed on Mar. 22, 2023.

(Continued)

*Primary Examiner* — Robert J Popovics
(74) *Attorney, Agent, or Firm* — Leydig, Voit & Mayer, Ltd.

(57) ABSTRACT

Filter disk segments, methods of use, and filter devices including the filter disk segments are disclosed.

7 Claims, 19 Drawing Sheets

(56) References Cited

U.S. PATENT DOCUMENTS

| | | | | | |
|---|---|---|---|---|---|
| 2,084,753 | A | * | 6/1937 | Watson | B01D 25/02 210/541 |
| 2,088,199 | A | * | 7/1937 | Gleason | B01D 29/41 210/347 |
| 2,103,572 | A | * | 12/1937 | Wells | B01D 35/18 210/347 |
| 2,263,853 | A | * | 11/1941 | Re Qua | B01D 33/25 210/486 |
| 2,395,301 | A | * | 2/1946 | Sloan | D21J 3/00 210/493.1 |
| 2,444,147 | A | * | 6/1948 | Walton | B01D 29/41 D23/209 |
| 2,460,280 | A | * | 2/1949 | Finney | B01D 33/23 210/393 |
| 2,462,488 | A | * | 2/1949 | Gunn | B01D 35/147 210/438 |
| 2,472,012 | A | * | 5/1949 | Hanneman | B01D 29/41 210/508 |
| 2,473,979 | A | * | 6/1949 | Walton | B01D 29/41 210/347 |
| 2,475,833 | A | * | 7/1949 | Gunn | B01D 35/14 210/450 |
| 2,448,930 | A | * | 9/1949 | Stokes | B01D 29/41 264/273 |
| 2,495,095 | A | * | 1/1950 | Ewbank | B01D 29/46 210/442 |
| 2,508,976 | A | * | 5/1950 | Tessmer, Sr. | B01D 29/15 210/486 |
| 2,548,584 | A | * | 4/1951 | Briggs | B01D 29/23 210/457 |
| 2,591,056 | A | * | 4/1952 | Ericson | B01D 29/41 210/486 |
| 2,592,527 | A | * | 4/1952 | Armstrong | B01D 29/15 210/347 |
| 2,639,251 | A | * | 5/1953 | Kracklauer | B01D 29/41 156/92 |
| 2,654,440 | A | * | 10/1953 | Robinson | B01D 39/18 210/508 |
| 2,683,029 | A | * | 7/1954 | Ricardo | F02M 17/28 261/95 |
| 2,692,686 | A | * | 10/1954 | Fleck | B01D 35/147 210/488 |
| 2,697,524 | A | * | 12/1954 | Foust | B01D 29/41 210/346 |
| 2,708,521 | A | * | 5/1955 | Saloum | B01D 25/26 55/482 |
| 2,750,047 | A | * | 6/1956 | Hasbrouck | B01D 29/41 210/136 |
| 2,755,937 | A | * | 7/1956 | Gunn | B01D 25/26 210/492 |
| 2,760,641 | A | * | 8/1956 | Kracklauer | B01D 29/41 210/406 |
| 2,787,333 | A | * | 4/1957 | Boone | A62B 23/00 55/DIG. 35 |
| 2,788,901 | A | * | 4/1957 | Boeddinghaus | B01D 29/111 210/486 |
| 2,813,632 | A | * | 11/1957 | Muller | B01D 29/41 210/486 |
| 2,826,307 | A | * | 3/1958 | Pace | B01D 29/58 210/167.13 |
| 2,844,255 | A | * | 7/1958 | Cavenah | E04H 4/1209 210/240 |
| 2,850,169 | A | * | 9/1958 | Briggs | B01D 29/46 210/488 |
| 2,863,561 | A | * | 12/1958 | Just | B01D 29/41 210/486 |
| 2,902,164 | A | * | 9/1959 | Dornauf | B01D 25/02 210/486 |
| 2,964,194 | A | * | 12/1960 | Oliver, Jr. | B01D 33/23 210/486 |
| 2,966,269 | A | * | 12/1960 | Allen | B01D 29/41 184/6.24 |
| 2,997,777 | A | * | 8/1961 | Davies | B01D 39/2034 75/229 |
| 3,005,556 | A | * | 10/1961 | Jensen | B01D 25/02 210/488 |
| 3,019,905 | A | * | 2/1962 | Baker | B01D 29/41 210/493.1 |
| 3,021,954 | A | * | 2/1962 | Allen | B01D 29/15 210/253 |
| 3,083,834 | A | * | 4/1963 | Pall | B01D 29/15 210/489 |
| 3,111,963 | A | * | 11/1963 | Brockwell | F16C 33/1055 29/896.62 |
| 3,125,005 | A | * | 3/1964 | Kasten | B01D 29/46 493/329 |
| 3,152,988 | A | * | 10/1964 | Gutkowski | B01D 29/46 210/488 |
| 3,157,598 | A | * | 11/1964 | Rebiscoul | B01D 29/41 55/521 |
| 3,178,028 | A | * | 4/1965 | Charnock | B01D 29/15 210/488 |
| 3,187,898 | A | * | 6/1965 | Baker | B01D 29/41 210/167.13 |
| 3,195,730 | A | * | 7/1965 | Muller | B01D 29/46 210/488 |
| 3,209,915 | A | * | 10/1965 | Gutkowski | B01D 25/26 96/393 |
| 3,216,576 | A | * | 11/1965 | Roos | B01D 35/16 210/488 |
| 3,231,094 | A | * | 1/1966 | Wiegand | B01D 29/41 210/493.1 |
| 3,250,396 | A | * | 5/1966 | Gayring | B01D 29/66 210/182 |
| 3,259,248 | A | * | 7/1966 | Wiegand | B01D 29/41 210/488 |
| 3,261,474 | A | * | 7/1966 | Parker | B01D 29/111 210/488 |
| 3,291,312 | A | * | 12/1966 | Peterson | B01D 33/23 210/345 |
| 3,294,241 | A | * | 12/1966 | Sicard | B01D 25/02 210/232 |
| 3,294,242 | A | * | 12/1966 | Notari | B01D 25/26 210/417 |
| 3,315,336 | A | * | 4/1967 | Parker | B01D 29/41 29/896.62 |
| 3,315,812 | A | * | 4/1967 | Lewis | B01D 29/668 137/625.27 |
| 3,331,512 | A | * | 7/1967 | Vore | B01D 33/23 210/487 |
| 3,369,668 | A | * | 2/1968 | Glos, II | B01D 39/083 210/345 |
| 3,398,833 | A | * | 8/1968 | Marks | B01D 63/0822 210/486 |
| 3,398,834 | A | * | 8/1968 | Nuttall | B01D 61/08 210/336 |
| 3,437,208 | A | * | 4/1969 | Gutwirth | B01D 33/06 210/360.2 |
| 3,438,505 | A | * | 4/1969 | Luthi | B01D 33/23 210/486 |
| 3,473,668 | A | * | 10/1969 | Bunyard | B01D 29/46 210/492 |
| 3,477,582 | A | * | 11/1969 | Baldwin | B01D 29/41 210/232 |
| 3,486,627 | A | * | 12/1969 | Pearson, Jr. | B01D 29/39 210/486 |
| 3,491,886 | A | * | 1/1970 | Glos | B01D 33/23 210/333.1 |
| 3,493,119 | A | * | 2/1970 | Allen | B01D 29/41 210/489 |
| 3,497,452 | A | * | 2/1970 | Arvanitakis | B01D 33/37 210/663 |
| 3,512,647 | A | * | 5/1970 | Young | E04H 4/12 210/167.14 |
| 3,513,090 | A | * | 5/1970 | Burde | B01D 29/416 210/791 |
| 3,537,592 | A | * | 11/1970 | Odgen | B01D 25/26 210/345 |

(56) References Cited

U.S. PATENT DOCUMENTS

| | | | | |
|---|---|---|---|---|
| 3,568,845 A * | 3/1971 | Llamas | B01D 29/46 | 210/488 |
| 3,581,902 A * | 6/1971 | Bidler | B01D 39/2034 | 210/486 |
| 3,610,419 A * | 10/1971 | Vallee | B01D 33/23 | 210/326 |
| 3,618,783 A * | 11/1971 | Cuyler | B01D 25/26 | 210/492 |
| 3,643,803 A * | 2/1972 | Glos, II | B01D 33/23 | 210/232 |
| 3,647,084 A * | 3/1972 | Martin | B01D 25/26 | 210/488 |
| 3,648,843 A * | 3/1972 | Pearson | B01D 29/46 | 210/488 |
| 3,648,844 A * | 3/1972 | Krynski | B01D 33/23 | 210/331 |
| 3,666,107 A * | 5/1972 | Boggs | B01D 29/41 | 210/488 |
| 3,679,062 A * | 7/1972 | Burkhart | B01D 29/111 | 210/500.1 |
| 3,692,181 A * | 9/1972 | Davis | B01D 33/23 | 210/486 |
| 3,702,659 A * | 11/1972 | Clark | B01D 25/26 | 210/486 |
| 3,735,871 A * | 5/1973 | Bisko | B01D 29/41 | 210/167.28 |
| 3,851,526 A * | 12/1974 | Drexel | G01F 5/00 | 73/202 |
| 3,884,805 A * | 5/1975 | Bagdasarian | B01D 29/39 | 210/791 |
| 3,948,779 A * | 4/1976 | Jackson | B01D 33/23 | 210/331 |
| 3,957,636 A * | 5/1976 | Arvanitakis | B01D 37/02 | 210/770 |
| 3,971,722 A * | 7/1976 | Radford | B01D 33/23 | 210/489 |
| 3,984,317 A * | 10/1976 | Donovan | B01D 29/86 | 210/415 |
| 4,025,425 A * | 5/1977 | Croopnick | B01D 63/16 | 210/651 |
| 4,025,438 A * | 5/1977 | Gelman | B01D 29/56 | 210/489 |
| 4,032,442 A * | 6/1977 | Peterson | B01D 33/23 | 210/411 |
| 4,066,546 A * | 1/1978 | Sasaki | B01D 65/08 | 210/791 |
| 4,077,887 A * | 3/1978 | Langvik | B01D 33/23 | 210/486 |
| 4,115,277 A * | 9/1978 | Swank | A61M 1/3627 | 210/489 |
| 4,132,649 A * | 1/1979 | Croopnick | B01D 63/0822 | 210/488 |
| 4,139,472 A * | 2/1979 | Simonson | B01D 33/23 | 210/232 |
| 4,159,951 A * | 7/1979 | Davis | B01D 33/23 | 210/345 |
| 4,162,982 A * | 7/1979 | Chesner | B01D 33/23 | 210/486 |
| 4,179,378 A * | 12/1979 | Borre | B01D 33/23 | 210/232 |
| 4,190,544 A * | 2/1980 | Schnellmann | B01D 33/19 | 210/486 |
| 4,203,846 A * | 5/1980 | Barthelemy | B01D 33/23 | 210/486 |
| 4,221,663 A * | 9/1980 | Little | B01D 25/26 | 210/345 |
| 4,243,536 A * | 1/1981 | Prolss | B01D 63/10 | 55/484 |
| 4,282,094 A * | 8/1981 | Mitchell | B01D 37/02 | 210/DIG. 8 |
| 4,334,994 A * | 6/1982 | Jensen | B01D 25/26 | 210/336 |
| 4,347,208 A * | 8/1982 | Southall | B29C 45/14467 | 264/DIG. 48 |
| 4,361,486 A * | 11/1982 | Hou | B01D 37/02 | 210/764 |
| 4,378,292 A * | 3/1983 | Haase | B01D 53/08 | 422/220 |
| 4,379,051 A * | 4/1983 | Hiesinger | B01D 25/26 | 210/231 |
| 4,402,829 A * | 9/1983 | Cordua | B01D 29/46 | 210/488 |
| 4,430,232 A * | 2/1984 | Doucet | B01D 29/925 | 210/488 |
| 4,501,663 A * | 2/1985 | Merrill | B01D 65/003 | 210/321.84 |
| 4,549,963 A * | 10/1985 | Jensen | B01D 25/26 | 210/488 |
| 4,578,192 A * | 3/1986 | Muller | B01D 39/14 | 210/486 |
| 4,592,839 A * | 6/1986 | Rosenberg | B01D 29/46 | 210/488 |
| 4,601,824 A * | 7/1986 | Dreyer | B01D 63/084 | 210/336 |
| 4,606,824 A * | 8/1986 | Chu | B01J 20/28033 | 210/656 |
| 4,632,755 A * | 12/1986 | DeGraffenried | B01D 29/15 | 210/488 |
| 4,637,876 A * | 1/1987 | Dosoudil | B01D 33/23 | 210/486 |
| 4,637,877 A * | 1/1987 | Hartmann | B01D 29/41 | 55/484 |
| 4,639,317 A * | 1/1987 | Luoma, II | B01D 65/08 | 210/456 |
| 4,661,250 A * | 4/1987 | Rosenberg | B01D 29/46 | 210/411 |
| 4,683,060 A * | 7/1987 | Drori | B01D 29/46 | 210/446 |
| 4,686,038 A * | 8/1987 | Arnaud | B01D 29/46 | 210/450 |
| 4,686,040 A * | 8/1987 | Nilsson | B01D 33/23 | 210/486 |
| 4,686,041 A * | 8/1987 | Van den Berg | B01D 29/114 | 210/488 |
| 4,704,207 A * | 11/1987 | Chu | B01D 29/41 | 210/488 |
| 4,707,258 A * | 11/1987 | Drori | B01D 25/26 | 210/333.1 |
| 4,726,900 A * | 2/1988 | Keskinen | B01D 29/46 | 210/488 |
| 4,732,677 A * | 3/1988 | Thornton | B01D 29/41 | 210/488 |
| 4,744,901 A * | 5/1988 | Drori | B01D 29/46 | 210/488 |
| 4,751,000 A * | 6/1988 | Drori | B01D 29/46 | 210/446 |
| 4,753,731 A * | 6/1988 | Drori | B01D 29/46 | 210/488 |
| 4,783,262 A * | 11/1988 | Ostreicher | B01D 29/41 | 210/314 |
| 4,793,922 A * | 12/1988 | Morton | B01D 25/26 | 55/486 |
| 4,793,928 A * | 12/1988 | Tsukamoto | D01D 1/106 | 210/488 |
| 4,801,382 A * | 1/1989 | Kemmelmeyer | B01D 29/413 | 55/484 |
| 4,844,806 A * | 7/1989 | Drori | B01D 29/46 | 210/488 |
| 4,871,456 A * | 10/1989 | Naruo | B01D 63/084 | 210/488 |
| 4,871,457 A * | 10/1989 | Drori | B01D 25/26 | 210/333.1 |
| 4,876,007 A * | 10/1989 | Naruo | B01D 63/084 | 210/488 |
| 4,880,537 A * | 11/1989 | Drori | B01D 29/46 | 210/488 |
| 4,881,313 A * | 11/1989 | Artinyan | B01D 29/41 | 264/DIG. 48 |

(56) References Cited

U.S. PATENT DOCUMENTS

| | | | | |
|---|---|---|---|---|
| 4,902,420 A * | 2/1990 | Pall | B01D 29/41 | 55/501 |
| 4,925,557 A * | 5/1990 | Ahlberg, Jr | B01D 33/23 | 210/321.68 |
| 4,931,178 A * | 6/1990 | Manniso | B29C 66/73753 | 210/231 |
| 4,931,179 A * | 6/1990 | Nilsson | B01D 33/23 | 210/404 |
| 4,935,136 A * | 6/1990 | Drori | B01D 25/327 | 210/333.1 |
| 4,940,562 A * | 7/1990 | Watanabe | B29C 66/1224 | 264/234 |
| 4,950,403 A * | 8/1990 | Hauff | D21F 1/66 | 209/403 |
| 4,966,702 A * | 10/1990 | Drori | B01D 29/46 | 210/488 |
| 4,978,450 A * | 12/1990 | Drori | B01D 25/26 | 210/488 |
| 4,981,591 A * | 1/1991 | Ostreicher | B01D 39/18 | 210/508 |
| 4,994,183 A * | 2/1991 | Nilsson | B01D 33/74 | 210/247 |
| 5,013,461 A * | 5/1991 | Drori | B01D 29/46 | 210/488 |
| 5,030,349 A * | 7/1991 | Drori | B01D 25/26 | 210/411 |
| 5,037,562 A * | 8/1991 | Tarves, Jr. | B01D 61/145 | 210/780 |
| 5,041,221 A * | 8/1991 | Drusi | B01D 27/106 | 210/488 |
| 5,047,123 A * | 9/1991 | Arvanitakis | D06F 43/085 | 366/310 |
| 5,055,192 A * | 10/1991 | Artinyan | B01D 29/111 | 29/896.62 |
| 5,062,864 A * | 11/1991 | Hasegawa | B01D 25/26 | 55/495 |
| 5,069,790 A * | 12/1991 | Mordeki | B01D 29/46 | 210/488 |
| 5,073,262 A * | 12/1991 | Ahlberg | B01D 33/56 | 210/321.68 |
| 5,085,780 A * | 2/1992 | Ostreicher | B01D 39/00 | 210/683 |
| 5,085,784 A * | 2/1992 | Ostreicher | D21H 27/08 | 210/767 |
| 5,100,551 A * | 3/1992 | Pall | B01D 29/41 | 55/501 |
| 5,143,630 A * | 9/1992 | Rolchigo | B01D 33/722 | 210/405 |
| 5,158,691 A * | 10/1992 | McEwen | B01D 29/96 | 210/791 |
| 5,176,829 A * | 1/1993 | Drori | B01D 29/15 | 210/488 |
| 5,186,825 A * | 2/1993 | Drori | B01D 25/26 | 210/411 |
| RE34,218 E * | 4/1993 | Drori | B01D 29/114 | 210/488 |
| 5,227,065 A * | 7/1993 | Strid | B01D 33/23 | 210/404 |
| 5,254,250 A * | 10/1993 | Rolchigo | B01D 29/055 | 210/330 |
| 5,271,838 A * | 12/1993 | Rahimi | B01D 25/26 | 210/488 |
| 5,296,134 A * | 3/1994 | Zaiter | B01D 29/66 | 55/482 |
| 5,316,678 A * | 5/1994 | Heaslip | B29C 66/541 | 210/489 |
| 5,318,411 A * | 6/1994 | Heinrichs | F04C 29/026 | 417/313 |
| 5,330,644 A * | 7/1994 | Nilsson | B01D 33/23 | 210/324 |
| 5,389,256 A * | 2/1995 | McEwen | B01D 29/70 | 210/402 |
| 5,401,404 A * | 3/1995 | Strauss | B01D 17/0208 | 210/94 |
| 5,482,624 A * | 1/1996 | Swiatek | B01D 29/39 | 210/323.1 |
| 5,500,122 A * | 3/1996 | Schwartz | B01D 63/084 | 210/232 |
| 5,520,807 A * | 5/1996 | Myrna | B01D 63/084 | 210/488 |
| 5,536,405 A * | 7/1996 | Myrna | B01D 65/00 | 210/231 |
| 5,549,824 A * | 8/1996 | Trumpf | B01D 25/26 | 210/323.1 |
| 5,607,584 A * | 3/1997 | Swiatek | B01D 29/96 | 210/453 |
| 5,609,761 A * | 3/1997 | Franz | B01D 25/26 | 55/497 |
| 5,611,925 A * | 3/1997 | Yasue | B01D 29/41 | 210/488 |
| 5,618,422 A * | 4/1997 | Pelkio | B01D 33/23 | 210/323.1 |
| 5,635,062 A * | 6/1997 | Cameron | B01D 33/23 | 210/232 |
| 5,637,213 A * | 6/1997 | McEwen | B01D 29/41 | 210/402 |
| 5,641,402 A * | 6/1997 | Kohonen | B01D 33/21 | 210/330 |
| 5,645,626 A * | 7/1997 | Edlund | C01B 3/34 | 95/56 |
| 5,647,982 A * | 7/1997 | Haythornthwaite | B01D 33/23 | 210/486 |
| 5,679,249 A * | 10/1997 | Fendya | B01D 65/00 | 210/450 |
| 5,711,877 A * | 1/1998 | Gonzalez | B01D 29/15 | 210/488 |
| 5,730,869 A * | 3/1998 | Koppe | B01D 63/16 | 210/345 |
| 5,755,034 A * | 5/1998 | Yasue | B01D 25/001 | 29/897 |
| 5,766,466 A * | 6/1998 | Peterson | B01D 33/23 | 119/508 |
| 5,779,899 A * | 7/1998 | Shiomi | B01D 25/26 | 264/328.17 |
| 5,785,262 A * | 7/1998 | Tippett | B02C 17/161 | 241/74 |
| 5,788,860 A * | 8/1998 | Yasue | B29C 48/362 | 29/469 |
| 5,797,978 A * | 8/1998 | Rosenberg | B03C 3/155 | 96/87 |
| 5,820,756 A * | 10/1998 | McEwen | B01D 29/70 | 210/488 |
| 5,829,138 A * | 11/1998 | Yasue | B01D 29/41 | 210/488 |
| 5,855,799 A * | 1/1999 | Herrmann | B01D 29/52 | 210/791 |
| 5,858,230 A * | 1/1999 | Yasue | B01D 25/26 | 210/488 |
| 5,858,231 A * | 1/1999 | Drori | B01D 29/94 | 210/411 |
| RE36,133 E * | 3/1999 | Yasue | B29C 48/362 | 210/488 |
| 5,893,972 A * | 4/1999 | Peterson | B01D 33/23 | 210/497.3 |
| 5,925,247 A * | 7/1999 | Huebbel | B01D 63/084 | 210/231 |
| 5,935,424 A * | 8/1999 | Dyer | B01D 29/15 | 210/488 |
| 5,938,940 A * | 8/1999 | Zuk, Jr. | B01D 29/902 | 210/488 |
| 5,965,019 A * | 10/1999 | Olsen | B01D 29/41 | 210/453 |
| 5,993,674 A * | 11/1999 | Rolchigo | B01D 29/86 | 210/330 |
| 6,030,539 A * | 2/2000 | Zuk, Jr. | B01D 29/05 | 210/488 |
| 6,059,861 A * | 5/2000 | Davila | B01D 17/0217 | 96/392 |

(56) References Cited

U.S. PATENT DOCUMENTS

| | | | | |
|---|---|---|---|---|
| 6,062,392 A * | 5/2000 | Birmingham | B01D 45/08 95/32 |
| 6,106,713 A * | 8/2000 | Miller | B01D 29/92 210/414 |
| 6,106,776 A * | 8/2000 | Borovetz | B01D 63/16 422/44 |
| 6,113,783 A * | 9/2000 | Strid | B01D 33/82 210/404 |
| 6,117,322 A * | 9/2000 | Miller | B01D 65/08 210/489 |
| 6,139,253 A * | 10/2000 | Battrel | B01D 25/26 414/753.1 |
| 6,168,724 B1 * | 1/2001 | Hurwitz | B01D 29/41 210/330 |
| 6,217,826 B1 * | 4/2001 | Reeder | A61M 60/827 604/4.01 |
| 6,306,298 B1 * | 10/2001 | Diemer | B01D 29/96 210/450 |
| 6,306,300 B1 * | 10/2001 | Harding | B01D 29/41 210/486 |
| 6,309,544 B1 * | 10/2001 | Hurwitz | B01D 29/608 210/330 |
| 6,343,697 B1 * | 2/2002 | Hausdorf | B01D 25/26 210/488 |
| 6,348,175 B1 * | 2/2002 | Borovetz | B01D 63/16 604/6.14 |
| 6,368,513 B1 * | 4/2002 | Christophe | B01D 36/02 210/411 |
| 6,391,097 B1 * | 5/2002 | Rosenberg | B01D 29/46 96/87 |
| 6,391,199 B1 * | 5/2002 | Diemer | B01D 33/17 210/345 |
| 6,419,726 B1 * | 7/2002 | Frost | B01D 53/22 95/56 |
| 6,419,842 B1 * | 7/2002 | Kupka | F26B 7/00 210/330 |
| 6,464,084 B2 * | 10/2002 | Pulek | B01D 25/26 210/500.1 |
| 6,524,488 B1 * | 2/2003 | Insley | B01D 39/1692 210/488 |
| 6,698,592 B2 * | 3/2004 | Kenning | G01N 1/2273 209/143 |
| 6,712,966 B1 * | 3/2004 | Pulek | B01D 39/18 210/489 |
| 6,723,284 B1 * | 4/2004 | Reeder | A61M 1/267 261/150 |
| 6,749,751 B1 * | 6/2004 | Strohm | B01D 29/41 210/232 |
| 6,752,920 B2 * | 6/2004 | Harris | B01D 29/66 210/414 |
| 6,827,851 B1 * | 12/2004 | Strohm | B01D 25/26 210/488 |
| 6,835,232 B2 * | 12/2004 | Frost | C01B 3/503 95/56 |
| 6,875,352 B1 * | 4/2005 | Diemer | B01D 25/002 210/231 |
| 6,887,378 B2 * | 5/2005 | Blaze | B01D 29/96 210/470 |
| 6,918,951 B2 * | 7/2005 | Rosenberg | B03C 3/64 96/60 |
| 6,939,466 B2 * | 9/2005 | Pulek | B01D 25/001 210/500.1 |
| 7,153,425 B2 * | 12/2006 | Stankowski | B01D 29/58 210/438 |
| 7,178,676 B2 * | 2/2007 | Pulek | B01D 39/1607 210/500.1 |
| 7,192,528 B2 * | 3/2007 | Prochaska | B01D 29/46 210/350 |
| 7,210,585 B2 * | 5/2007 | Hajek | B01D 29/35 210/488 |
| 7,247,245 B1 * | 7/2007 | Proulx | B01D 27/07 210/450 |
| 7,267,236 B2 * | 9/2007 | Kuo | B01D 29/6438 210/415 |
| 7,281,410 B2 * | 10/2007 | Phillips | B01D 61/18 210/651 |
| 7,351,345 B2 * | 4/2008 | Diemer | B01J 20/28097 427/244 |
| 7,370,766 B2 * | 5/2008 | Perala | B01D 39/08 210/507 |
| 7,390,403 B2 * | 6/2008 | Siwak | B01J 20/28028 210/348 |
| 7,396,462 B2 * | 7/2008 | Kuo | B01D 29/41 210/415 |
| 7,566,399 B2 * | 7/2009 | Kuo | B01D 63/084 210/357 |
| 7,582,209 B2 * | 9/2009 | Pulek | B01D 63/084 210/489 |
| 7,638,050 B2 * | 12/2009 | Kuo | C02F 3/082 210/488 |
| 7,666,305 B2 * | 2/2010 | Park | B01D 25/26 210/321.63 |
| 7,670,481 B2 * | 3/2010 | Madsen | B01D 29/46 210/402 |
| 7,794,594 B2 * | 9/2010 | Diemer | B01D 25/26 210/486 |
| 7,857,969 B2 * | 12/2010 | Strohm | B01D 25/26 210/232 |
| 7,887,702 B2 * | 2/2011 | Park | B01D 63/0822 210/619 |
| 7,959,780 B2 * | 6/2011 | Hawkins | B01D 69/06 204/632 |
| 7,985,343 B2 * | 7/2011 | Haldopoulos | B01D 25/26 95/286 |
| 8,114,287 B2 * | 2/2012 | Harris | B01D 29/66 210/337 |
| 8,128,824 B2 * | 3/2012 | Diemer | B01D 25/26 210/486 |
| 8,220,640 B2 * | 7/2012 | Schmitz | B01D 29/46 210/231 |
| 8,303,825 B2 * | 11/2012 | Harris | B01D 29/66 210/773 |
| D681,775 S * | 5/2013 | Bott | D23/209 |
| 8,475,616 B2 * | 7/2013 | McCutchen | B01F 27/412 977/842 |
| 8,480,893 B2 * | 7/2013 | Kuo | B01D 33/073 210/232 |
| 8,628,661 B2 * | 1/2014 | Gaudfrin | B01D 33/803 210/232 |
| 8,651,283 B2 * | 2/2014 | Altwies | B01D 33/23 210/493.1 |
| 8,875,904 B2 * | 11/2014 | Choi | B01D 25/26 210/488 |
| 9,072,988 B2 * | 7/2015 | Siwak | B01J 20/28014 |
| 9,138,666 B2 * | 9/2015 | Chrupalla | B01D 25/26 |
| 9,242,193 B2 * | 1/2016 | Bryan | B01D 29/46 |
| 9,440,171 B2 * | 9/2016 | McCutchen | C08J 9/0066 |
| 9,474,992 B2 * | 10/2016 | Bryan | B01D 29/41 |
| 9,492,769 B2 * | 11/2016 | Iwasaki | B01D 29/56 |
| 9,555,349 B2 * | 1/2017 | Hoefken | B01D 33/23 |
| 9,604,162 B2 * | 3/2017 | Hoefken | B01D 33/50 |
| 9,616,362 B2 * | 4/2017 | Johnson | B01D 35/30 |
| 9,636,638 B2 * | 5/2017 | Gadgaard | B01D 63/16 |
| 9,675,914 B2 * | 6/2017 | Rivera | B01D 29/96 |
| 9,707,497 B2 * | 7/2017 | Lin | B01D 29/05 |
| 9,732,880 B2 * | 8/2017 | Haines | F16K 3/24 |
| 9,776,111 B2 * | 10/2017 | Schildermans | B01D 39/2034 |
| 9,861,920 B1 * | 1/2018 | Richardson | B01D 29/0093 |
| 9,889,393 B2 * | 2/2018 | Nakagawa | C02F 1/44 |
| 9,895,638 B2 * | 2/2018 | Verschaeve | C08G 85/002 |
| 9,968,875 B2 * | 5/2018 | Gabrielsson | B01D 35/28 |
| 10,005,213 B2 * | 6/2018 | Ralvert | B29C 55/02 |
| 10,173,151 B2 * | 1/2019 | Lucas | B01D 29/05 |
| 10,207,210 B2 * | 2/2019 | Petit | B01D 33/11 |
| 10,220,335 B2 * | 3/2019 | Lee | B01D 33/23 |
| 10,220,336 B2 * | 3/2019 | Kotler | B01D 33/15 |
| 10,301,986 B2 * | 5/2019 | Lapoint | F01M 11/03 |
| 10,456,717 B2 * | 10/2019 | Orlans | B01D 29/46 |
| 10,532,940 B2 * | 1/2020 | Smith | B01F 27/191 |

(56) References Cited

U.S. PATENT DOCUMENTS

| | | | |
|---|---|---|---|
| 10,537,840 B2* | 1/2020 | McCutchen | B01D 45/14 |
| 10,589,204 B2* | 3/2020 | Richardson | B01D 39/2075 |
| 10,688,414 B2* | 6/2020 | Estachy | B01D 29/682 |
| 10,758,849 B2* | 9/2020 | Richardson | B01D 29/46 |
| 10,807,020 B2* | 10/2020 | Hemstock | F15D 1/14 |
| 10,807,295 B2* | 10/2020 | Kastner | B29C 48/2735 |
| 10,814,282 B2* | 10/2020 | Vänttinen | B01D 71/02 |
| 10,835,843 B2* | 11/2020 | Mcleod | C11C 1/025 |
| 10,843,109 B2* | 11/2020 | Fich | B01D 29/15 |
| 10,857,491 B2* | 12/2020 | Braschi | B01D 33/23 |
| 10,888,807 B2* | 1/2021 | Harden | B01D 33/41 |
| 10,918,985 B2* | 2/2021 | Marks | B01D 29/41 |
| 10,927,020 B2* | 2/2021 | Davie | B01D 63/16 |
| 10,933,357 B2* | 3/2021 | Kastner | B29C 48/2735 |
| 11,000,791 B2* | 5/2021 | Jibert | B01D 33/06 |
| 11,035,216 B2* | 6/2021 | Hemstock | E21B 43/35 |
| 11,065,567 B2* | 7/2021 | Gaudfrin | B01D 33/23 |
| 11,103,812 B2* | 8/2021 | Canaia | B29C 48/2545 |
| 11,148,340 B2* | 10/2021 | Prinzo | B29C 48/2554 |
| 11,173,440 B2* | 11/2021 | Herman | F01M 13/04 |
| 11,260,570 B2* | 3/2022 | Rosamond, III | B29C 48/6912 |
| 11,400,393 B2* | 8/2022 | Dedul | B01D 29/41 |
| 11,478,731 B2* | 10/2022 | Gabrielsson | D21G 9/00 |
| 11,491,424 B2* | 11/2022 | Wöstmann | B01D 29/56 |
| 11,684,874 B2* | 6/2023 | Hong | B01D 29/46 210/335 |
| 11,786,850 B2* | 10/2023 | Fich | B01D 29/31 210/435 |
| 11,801,460 B2* | 10/2023 | Nicolle | B01D 25/327 |
| 12,023,629 B2* | 7/2024 | Hemstock | B01D 63/0821 |
| 2001/0013493 A1* | 8/2001 | Pulek | B01D 39/18 156/1 |
| 2002/0023873 A1* | 2/2002 | Blaze | B01D 35/30 210/323.1 |
| 2002/0060182 A1* | 5/2002 | O'Connell | B01D 29/46 210/443 |
| 2002/0060184 A1* | 5/2002 | Pulek | B01D 39/1607 210/488 |
| 2002/0107131 A1* | 8/2002 | Jorgensen | A61M 1/3692 494/45 |
| 2002/0195388 A1* | 12/2002 | Sierens | B01D 29/41 210/486 |
| 2003/0075492 A1* | 4/2003 | Kuo | B01D 25/26 210/231 |
| 2003/0080043 A1* | 5/2003 | Renganath | B01D 29/111 210/490 |
| 2003/0089657 A1* | 5/2003 | Drori | B01D 29/90 210/411 |
| 2003/0159981 A1* | 8/2003 | Diemer | B01D 25/26 210/486 |
| 2003/0173283 A1* | 9/2003 | Pulek | B01D 63/084 210/321.61 |
| 2003/0201229 A1* | 10/2003 | Siwak | B01D 61/147 210/806 |
| 2003/0213742 A1* | 11/2003 | DeCoste | B01D 29/44 210/486 |
| 2004/0020838 A1* | 2/2004 | Gabl | B01D 63/081 210/232 |
| 2004/0035801 A1* | 2/2004 | Backman | B01D 29/46 210/741 |
| 2004/0108264 A1* | 6/2004 | Hajek | B01D 29/35 210/488 |
| 2004/0118766 A1* | 6/2004 | Pulek | B01D 29/41 210/317 |
| 2004/0154973 A1* | 8/2004 | Blaze | B01D 35/31 210/323.1 |
| 2005/0000887 A1* | 1/2005 | Scheucher | B01D 33/23 210/493.1 |
| 2005/0011840 A1* | 1/2005 | Stankowski | B01D 29/018 210/767 |
| 2005/0016936 A1* | 1/2005 | Stankowski | B01D 29/58 210/435 |
| 2005/0061729 A1* | 3/2005 | Strohm | B01D 25/26 210/284 |
| 2005/0082217 A1* | 4/2005 | Hagg | B01D 33/23 210/493.1 |
| 2005/0121379 A1* | 6/2005 | Strohm | B01D 25/26 210/284 |
| 2005/0167353 A1* | 8/2005 | Pulek | B01D 39/163 210/317 |
| 2005/0178704 A1 | 8/2005 | Prochaska et al. | |
| 2005/0205489 A1* | 9/2005 | Siwak | B01D 15/3809 210/500.21 |
| 2005/0252845 A1* | 11/2005 | Kemmelmeyer | B01D 63/084 210/488 |
| 2005/0263918 A1* | 12/2005 | Heidenreich | B01D 63/16 210/488 |
| 2006/0237358 A1* | 10/2006 | Kuo | B01D 29/6438 210/415 |
| 2007/0045166 A1* | 3/2007 | Fanning | F16L 27/113 210/488 |
| 2007/0062859 A1* | 3/2007 | Pulek | B01D 29/111 210/488 |
| 2007/0084780 A1* | 4/2007 | Kuo | B01D 29/96 210/488 |
| 2007/0095742 A1* | 5/2007 | Ruskin | B01D 29/46 210/791 |
| 2007/0144956 A1* | 6/2007 | Park | B01D 63/084 210/330 |
| 2007/0151917 A1* | 7/2007 | Kuo | B01D 29/41 210/335 |
| 2008/0035584 A1* | 2/2008 | Petit | B01D 29/07 210/780 |
| 2008/0073264 A1* | 3/2008 | Kuo | B01D 63/16 210/488 |
| 2008/0110821 A1* | 5/2008 | Kuo | B01D 29/41 210/489 |
| 2008/0164195 A1* | 7/2008 | Siwak | B01D 69/1411 210/198.2 |
| 2008/0173580 A1* | 7/2008 | Leow | B01D 29/114 210/498 |
| 2008/0210620 A1* | 9/2008 | Madsen | B01D 29/46 210/416.1 |
| 2008/0257801 A1 | 10/2008 | Neeman | |
| 2008/0257814 A1* | 10/2008 | Vigna | B01D 25/26 210/321.75 |
| 2008/0272068 A1* | 11/2008 | Harris | B01D 29/46 210/791 |
| 2008/0296238 A1* | 12/2008 | Haldopoulos | B01D 25/26 55/440 |
| 2009/0114587 A1* | 5/2009 | Kuo | B01D 63/084 210/346 |
| 2009/0192280 A1* | 7/2009 | Otoshi | B29C 48/917 536/63 |
| 2010/0012572 A1* | 1/2010 | Verschaeve | B01D 29/41 29/DIG. 77 |
| 2010/0113653 A1* | 5/2010 | Ueda | B29C 48/37 524/35 |
| 2010/0140177 A1* | 6/2010 | Diemer | B01D 29/54 210/231 |
| 2010/0264077 A1* | 10/2010 | Pulek | B01D 29/41 210/317 |
| 2010/0264100 A1* | 10/2010 | Rivera | B01D 29/96 210/450 |
| 2010/0307665 A1* | 12/2010 | McCutchen | B01D 39/14 977/842 |
| 2010/0320139 A1* | 12/2010 | Diemer | B01D 25/26 210/346 |
| 2011/0006018 A1* | 1/2011 | Ben-Horin | B01D 29/46 210/767 |
| 2011/0024347 A1* | 2/2011 | Larsson | B01D 33/23 210/331 |
| 2011/0094959 A1* | 4/2011 | Kurimoto | B01D 29/055 210/498 |
| 2011/0253618 A1* | 10/2011 | Choi | B01D 25/26 210/486 |
| 2011/0259812 A1* | 10/2011 | Marks | B01D 46/58 29/527.1 |

(56) References Cited

U.S. PATENT DOCUMENTS

| | | | | |
|---|---|---|---|---|
| 2011/0297604 A1* | 12/2011 | Bryan | B01D 35/303 | 210/252 |
| 2012/0211441 A1* | 8/2012 | Harris | B01D 29/46 | 210/780 |
| 2012/0248390 A1* | 10/2012 | Matsuda | C08K 5/5477 | 536/63 |
| 2013/0008848 A1* | 1/2013 | Jonsson | B01D 29/46 | 210/488 |
| 2013/0112611 A1* | 5/2013 | Schildermans | B01D 29/111 | 156/60 |
| 2013/0161252 A1* | 6/2013 | Chrupalla | B01D 25/327 | 210/411 |
| 2013/0175208 A1* | 7/2013 | Madsen | B01D 63/16 | 210/330 |
| 2013/0186820 A1* | 7/2013 | Tal | B01D 33/23 | 210/332 |
| 2013/0186824 A1* | 7/2013 | Harris | B01D 63/084 | 210/636 |
| 2013/0186841 A1* | 7/2013 | Johnson | B01D 36/001 | 210/256 |
| 2013/0206677 A1* | 8/2013 | Kuo | B01D 33/23 | 210/409 |
| 2013/0213901 A1* | 8/2013 | Harris | B01D 29/46 | 210/488 |
| 2013/0228506 A1* | 9/2013 | Ralvert | B29C 45/14262 | 210/486 |
| 2013/0299408 A1* | 11/2013 | Olenberg | B01D 33/21 | 210/345 |
| 2013/0299415 A1* | 11/2013 | McCutchen | C08F 2/32 | 264/413 |
| 2014/0197093 A1* | 7/2014 | Gabrielsson | B01D 35/28 | 210/485 |
| 2014/0291231 A1* | 10/2014 | Wostmann | B01D 29/56 | 210/489 |
| 2015/0122723 A1* | 5/2015 | Orlans | B01D 29/70 | 210/411 |
| 2015/0129510 A1* | 5/2015 | Johnson | B01D 35/30 | 210/436 |
| 2015/0144546 A1* | 5/2015 | Iwasaki | B01D 29/56 | 210/236 |
| 2015/0190758 A1* | 7/2015 | Gadgaard | B01D 63/084 | 210/483 |
| 2015/0246302 A1* | 9/2015 | Petit | B01D 29/07 | 210/330 |
| 2015/0258468 A1* | 9/2015 | Siwak | B01D 29/41 | 210/198.2 |
| 2015/0290564 A1* | 10/2015 | Hoefken | B01D 33/067 | 210/331 |
| 2015/0290565 A1* | 10/2015 | Hoefken | B01D 33/15 | 210/331 |
| 2015/0298032 A1* | 10/2015 | Tinkham | B01D 29/56 | 210/489 |
| 2015/0352468 A1* | 12/2015 | Lin | B01D 35/303 | 210/335 |
| 2016/0051911 A1* | 2/2016 | Hayashi | B01D 29/413 | 210/483 |
| 2016/0130165 A1* | 5/2016 | Park | C02F 1/004 | 210/96.1 |
| 2016/0175744 A1* | 6/2016 | Lucas | B01D 29/012 | 210/489 |
| 2016/0193767 A1* | 7/2016 | Ralvert | B29C 45/1671 | 264/257 |
| 2016/0236120 A1* | 8/2016 | Richardson | B01D 29/46 | |
| 2016/0263497 A1* | 9/2016 | Giasson | B01D 33/803 | |
| 2017/0008781 A1* | 1/2017 | Richardson | C02F 1/004 | |
| 2017/0043284 A1* | 2/2017 | Petit | C02F 1/004 | |
| 2017/0080367 A1* | 3/2017 | Johnson | B01D 29/41 | |
| 2017/0128866 A1* | 5/2017 | Verschaeve | B23K 31/02 | |
| 2017/0165597 A1* | 6/2017 | Kotler | B01D 33/503 | |
| 2017/0172346 A1* | 6/2017 | Mcleod | B01D 29/41 | |
| 2017/0189839 A1* | 7/2017 | Fich | B01D 29/15 | |
| 2018/0065288 A1* | 3/2018 | Kastner | B29C 48/503 | |
| 2018/0093210 A1* | 4/2018 | Schmieder | B01D 29/46 | |
| 2018/0104880 A1* | 4/2018 | Fukuda | B01D 29/0093 | |
| 2018/0154291 A1* | 6/2018 | Malo | B01D 33/23 | |
| 2018/0214800 A1* | 8/2018 | Gabrielsson | D21D 5/04 | |
| 2018/0326357 A1* | 11/2018 | Vänttinen | B01D 71/02 | |
| 2018/0369725 A1* | 12/2018 | Gaudfrin | B01D 33/23 | |
| 2019/0209950 A1* | 7/2019 | Estachy | B01D 29/50 | |
| 2019/0224597 A1* | 7/2019 | Harden | B01D 33/466 | |
| 2020/0102702 A1* | 4/2020 | Hedlund | D21D 1/306 | |
| 2021/0046407 A1* | 2/2021 | Dedul | B01D 29/413 | |
| 2021/0053001 A1* | 2/2021 | Fich | B01D 29/15 | |
| 2021/0094001 A1* | 4/2021 | Wang | C02F 1/441 | |
| 2021/0129059 A1* | 5/2021 | Harden | B01D 33/073 | |
| 2021/0170310 A1* | 6/2021 | Kotler | B01D 33/21 | |
| 2021/0170311 A1* | 6/2021 | Whitlock | B01D 46/58 | |
| 2022/0054984 A1* | 2/2022 | Hemstock | B01D 25/215 | |
| 2022/0203272 A1* | 6/2022 | Hong | B01D 29/46 | |
| 2022/0347603 A1* | 11/2022 | Whitlock | B01D 29/41 | |
| 2022/0379246 A1* | 12/2022 | Dedul | B01D 25/26 | |
| 2023/0256365 A1* | 8/2023 | Takano | B29C 48/503 | 210/348 |

FOREIGN PATENT DOCUMENTS

| | | |
|---|---|---|
| EP | 0 284 404 A2 | 9/1988 |
| EP | 0 701 854 A1 | 9/1995 |
| JP | S63-315111 A | 12/1988 |
| JP | 2005-511293 A | 4/2005 |
| JP | 2011-515206 A | 5/2011 |
| TW | 181504 U | 4/1992 |
| WO | WO 2008/051227 A2 | 5/2008 |
| WO | WO 2022/004315 A1 | 1/2022 |

OTHER PUBLICATIONS

European Patent Office, Extended European Search Report issued in European Patent Application No. 22168436.8, mailed on Aug. 31, 2022.

Taiwan Intellectual Property Office, Office Action issued in Taiwan Patent Application No. 111113835, mailed on Jul. 19, 2023.

China National Intellectual Property Administration, Office Action issued in Chinese Patent Application No. 202210471881.X, mailed on Aug. 26, 2023.

* cited by examiner

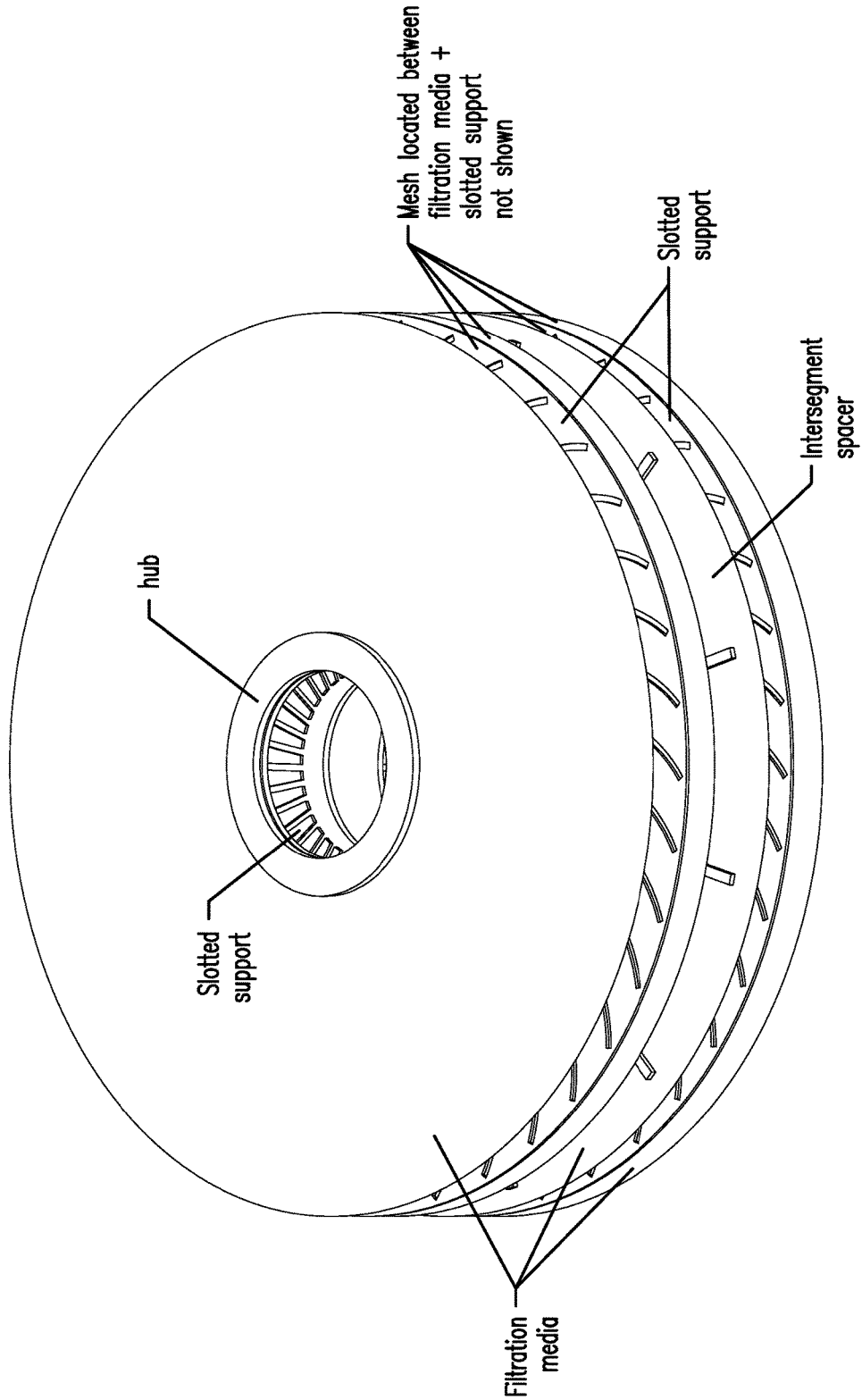

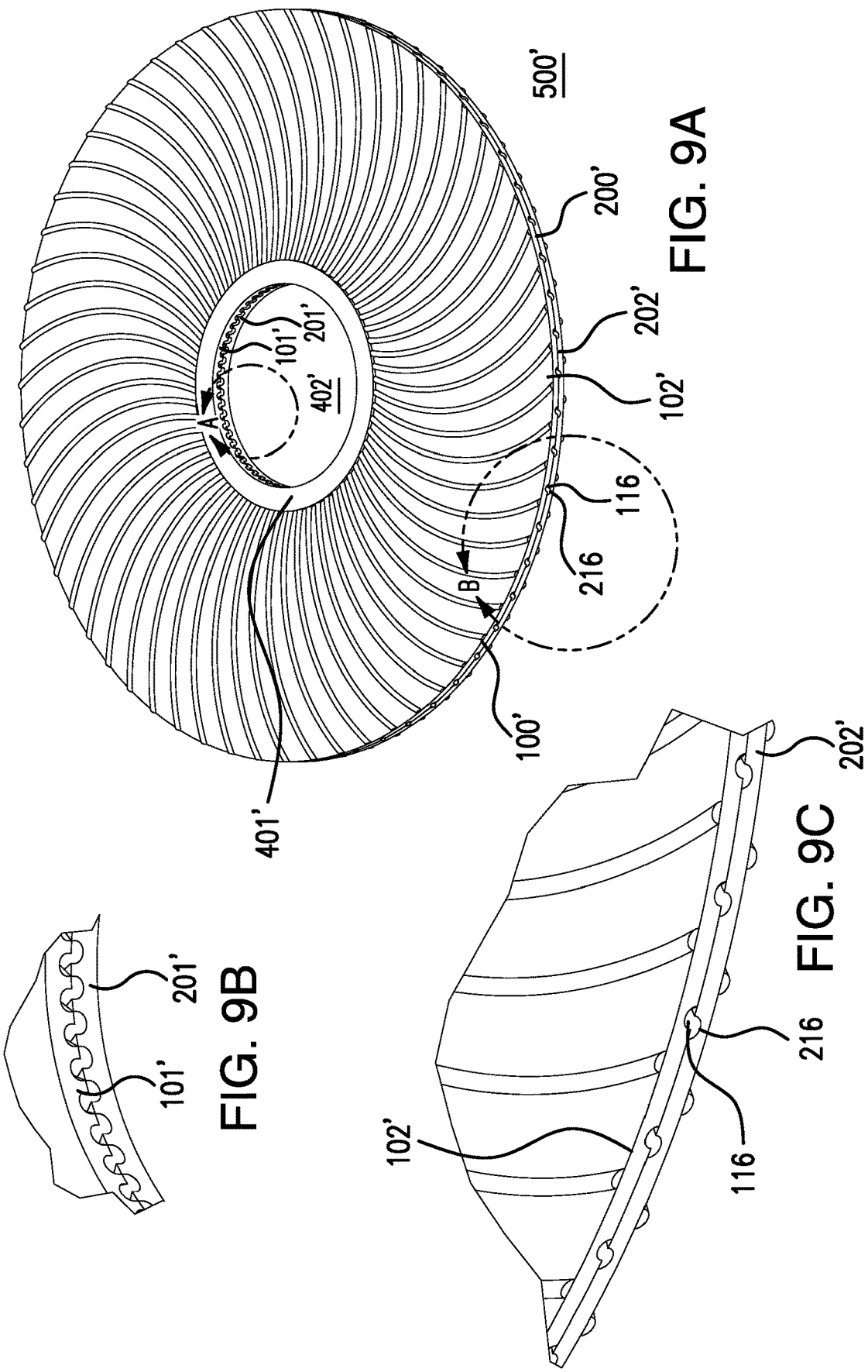

FILTER DISK SEGMENTS

BACKGROUND OF THE INVENTION

Commercially available filter disk segments include a plurality of separately produced components, for example, a spacer, filter media, and a slotted support. However, there is a need for improved filter disk segments.

The present invention provides for ameliorating at least some of the disadvantages of the prior art. These and other advantages of the present invention will be apparent from the description as set forth below.

BRIEF SUMMARY OF THE INVENTION

An aspect of the invention provides a filter disk segment comprising (a) a filter element disk comprising a central hub having a central hub opening; (i) a first porous component including a first end by the central hub opening, and a second end distal to the first end, the first porous component having an upper surface including at least two raised fluid flow channels having porous walls, each of the at least two raised fluid flow channels extending toward the first end and the second end, and a lower surface facing a drainage component; (ii) a second porous component including a first end by the central hub opening, and a second end distal to the first end, the second porous component having an upper surface facing the drainage component and a lower surface including at least two raised fluid flow channels having porous walls, each of the at least two raised fluid flow channels extending toward the first end and the second end; (iii) the drainage component allowing fluid flow therethrough arranged between, and in fluid communication with, the first porous component and the second porous component, the drainage component including the central hub opening; wherein the central hub supports the first porous component, the second porous component, and the drainage component.

In another aspect of the invention, a filter disk segment is provided comprising (a) a filter element disk comprising a central hub having a central hub opening; (i) a first porous component including a first end by the central hub opening, and a second end distal to the first end, the first porous component having an upper surface including at least two raised porous ribs, each of the at least two raised porous ribs extending toward the first end and the second end, and a lower surface facing a drainage component, the lower surface including at least two fluid flow channels, each of the at least two fluid flow channels extending toward the first end and the second end; (ii) a second porous component including a first end by the central hub opening, and a second end distal to the first end, the second porous component having an upper surface facing the drainage component, the upper surface including at least two fluid flow channels, each of the at least two fluid flow channels extending toward the first end and the second end, and a lower surface including at least two raised porous ribs, each of the at least two raised porous ribs extending toward the first end and the second end; (iii) the drainage component allowing fluid flow therethrough arranged between, and in fluid communication with, the first porous component and the second porous component, the drainage component including the central hub opening; wherein the central hub supports the first porous component, the second porous component, and the drainage component.

Another aspect of the invention comprises a filter device comprising at least two filter disk segments according to an aspect of the invention, the filter device comprising an inlet and an outlet and defining a fluid flow path between the inlet and the outlet, with the at least two filter disk segments arranged in the housing across the fluid flow path.

A method of filtering fluid according to an aspect of the invention is also provided, the method comprising passing the fluid through at least one filter disk segment, preferably, at least two filter disk segments, more preferably passing the fluid through a filter device comprising at least two filter disk segments according to an aspect of the invention.

BRIEF DESCRIPTION OF THE SEVERAL VIEWS OF THE DRAWING(S)

FIG. 1A is a perspective view of two filter disk segments each having two porous components according to an aspect of the invention, wherein the filter disk segments do not show the drainage component between the porous components, before welding the edges of each filter segment together; FIG. 1B shows the filter disk segments shown in FIG. 1A, wherein the edges of each filter disk segment are welded together; FIG. 1C is an exploded view of a commercially available filter disk segment.

FIG. 2A is an enlarged diagrammatic partial cross-sectional view showing fluid flow through a portion of the filter disk segment according to an aspect of the invention, also showing that fluid passing through the curved fluid flow channel accesses more surface area; FIG. 2B is an enlarged diagrammatic partial cross-sectional view showing fluid flow through a portion of a commercially available filter disk segment.

FIG. 3A is a diagrammatic view showing fluid flow through the gap between adjacent filter disk segments before passing through the filter media according to an aspect of the invention, also showing less flow area due to raised fluid flow channels, resulting in lower residence time in the gap; FIG. 3B is a diagrammatic view showing fluid flow through the gap due to the spacer between adjacent filter disk segments before passing through the filter media in a commercially available filter disk segment.

FIG. 4A is a top view of a filter element disk including a porous component according to an aspect of the invention; FIG. 4B is a bottom view of the filter element disk including the porous component shown in FIG. 4A, also showing the cross-sectional areas of the fluid flow channels decreasing from the outer end of the element disk toward the inner end by the central hub of the element disk; FIG. 4C is a side view of the porous component shown in FIG. 4A; FIG. 4D is an enlarged view of region "A" shown in FIG. 4C; and FIG. 4E is a cross-sectional view along line B-B of the porous component of the filter element disk shown in FIG. 4A.

FIG. 5A is an isometric top view of a filter disk segment according to an aspect of the invention (before sealing the edges); FIG. 5B is a partial cut-away view of the filter disk segment shown in FIG. 5A, also showing the drainage component between the porous components; FIG. 5C is a side view of the filter disk segment shown in FIG. 5A; FIG. 5D is an enlarged view of region "A" shown in FIG. 5C; and FIG. 5E shows fluid flow channels in one porous component through the other porous component in broken lines.

Figure 8A:
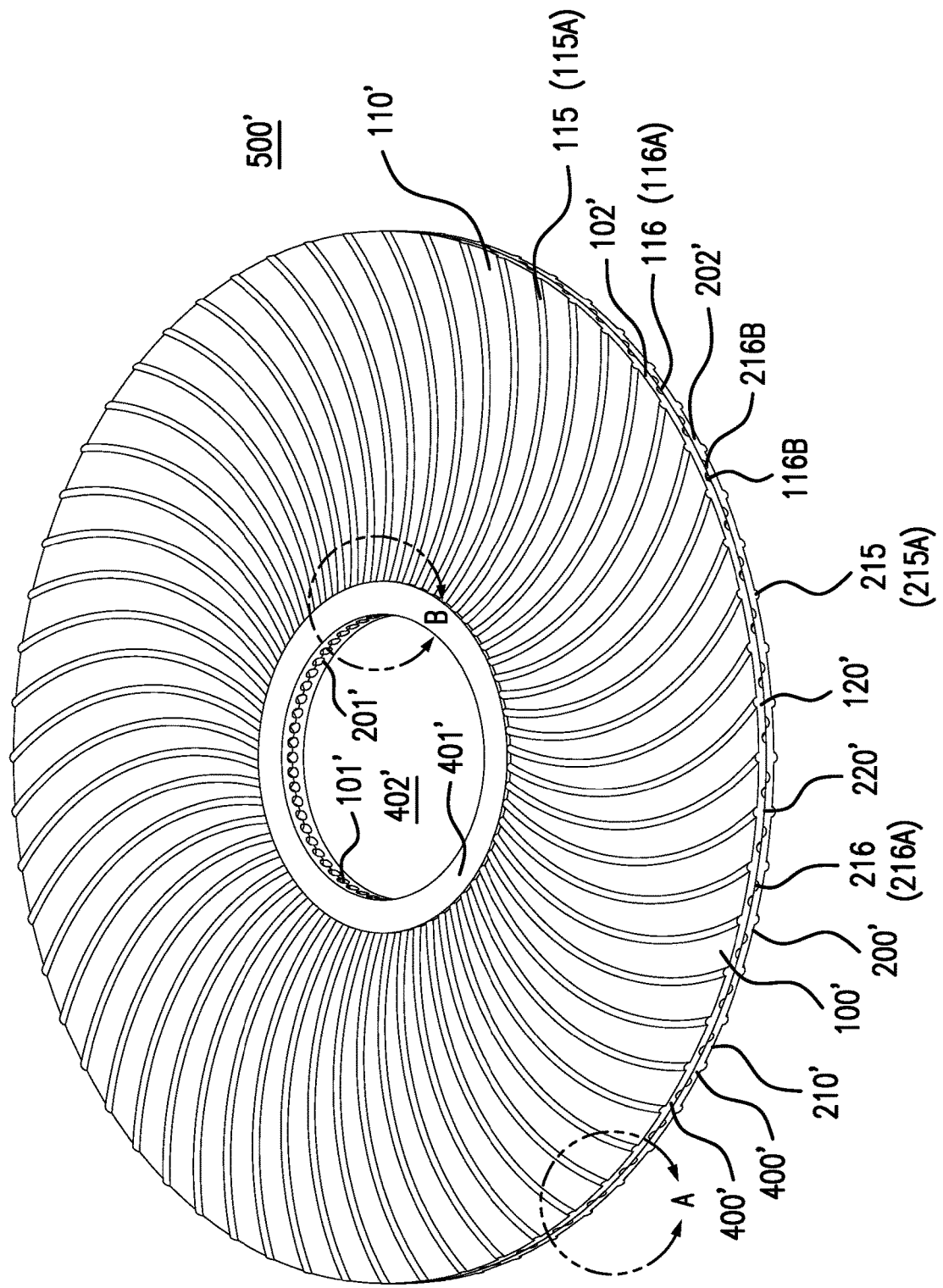
Figure 8B:
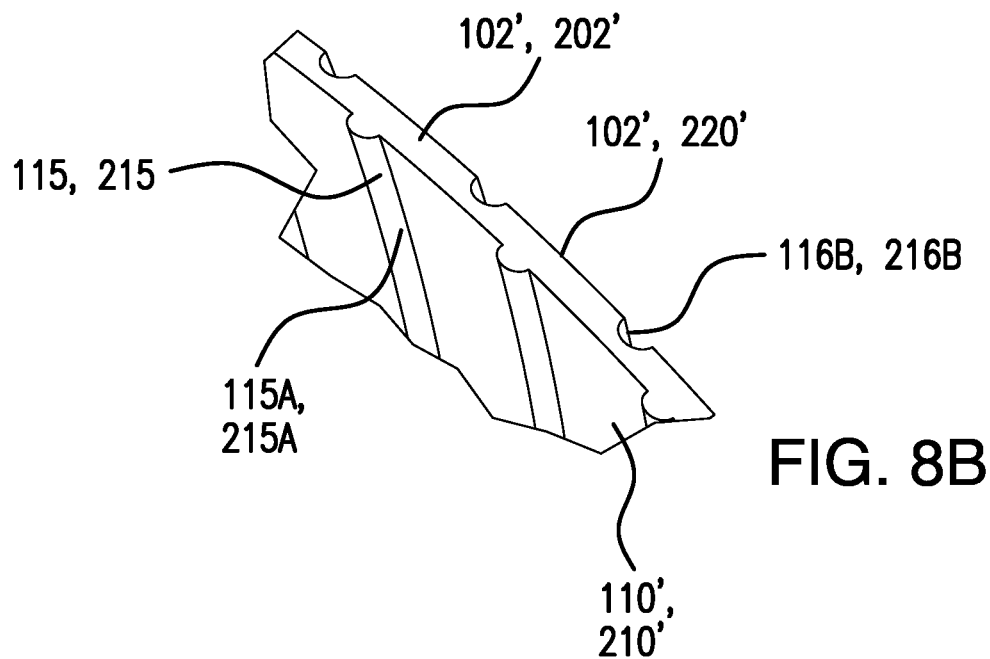
Figure 8C:
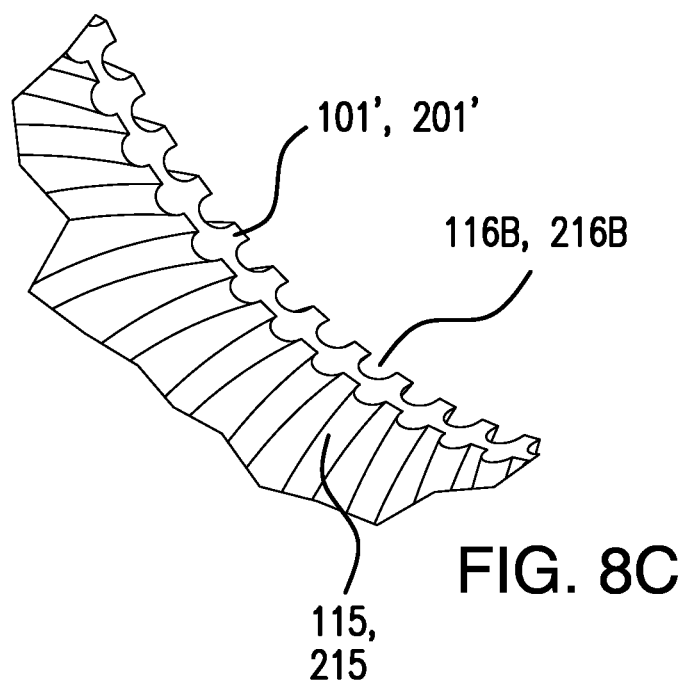

FIG. 8A is an isometric top view of a filter disk segment according to another aspect of the invention, including upper and lower porous components each having a plurality of raised porous ribs on one side, and a plurality of fluid flow channels on the other side (before sealing the edges); FIG. 8B is an enlarged view of region "A" shown in FIG. 8A (FIG. 8B showing one porous component); and FIG. 8C is an enlarged view of region "B" shown in FIG. 8A (FIG. 8C showing one porous component).

FIG. 9A is a perspective view of another assembled filter disk segment including filter element disks as shown in FIG. 8A (before sealing the edges); FIG. 9B is an enlarged view of region "A" shown in FIG. 9A; and FIG. 9C is an enlarged view of region "B" shown in FIG. 9A.

DETAILED DESCRIPTION OF THE INVENTION

In accordance with an aspect of the invention, a filter disk segment comprises (a) a filter element disk comprising a central hub having a central hub opening; (i) a first porous component including a first end by the central hub opening, and a second end distal to the first end, the first porous component having an upper surface including at least two raised fluid flow channels having porous walls, each of the at least two raised fluid flow channels extending toward the first end and the second end, and a lower surface facing a drainage component; (ii) a second porous component including a first end by the central hub opening, and a second end distal to the first end, the second porous component having an upper surface facing the drainage component and a lower surface including at least two raised fluid flow channels having porous walls, each of the at least two raised fluid flow channels extending toward the first end and the second end; (iii) the drainage component allowing fluid flow therethrough arranged between, and in fluid communication with, the first porous component and the second porous component, the drainage component including the central hub opening; wherein the central hub supports the first porous component, the second porous component, and the drainage component.

In another aspect of the invention, a filter disk segment is provided comprising (a) a filter element disk comprising a central hub having a central hub opening; (i) a first porous component including a first end by the central hub opening, and a second end distal to the first end, the first porous component having an upper surface including at least two raised porous ribs, each of the at least two raised porous ribs extending toward the first end and the second end, and a lower surface facing a drainage component, the lower surface including at least two fluid flow channels, each of the at least two fluid flow channels extending toward the first end and the second end; (ii) a second porous component including a first end by the central hub opening, and a second end distal to the first end, the second porous component having an upper surface facing the drainage component, the upper surface including at least two fluid flow channels, each of the at least two fluid flow channels extending toward the first end and the second end, and a lower surface including at least two raised porous ribs, each of the at least two raised porous ribs extending toward the first end and the second end; (iii) the drainage component allowing fluid flow therethrough arranged between, and in fluid communication with, the first porous component and the second porous component, the drainage component including the central hub opening; wherein the central hub supports the first porous component, the second porous component, and the drainage component.

In typical aspects, each of the at least two raised fluid flow channels in the first porous component and in the second porous component extend continuously from the first end to the second end.

In some aspects, the at least two raised fluid flow channels in the first porous component are offset from the at least two raised fluid flow channels in the second porous component.

In some aspects, each of the at least two raised porous ribs and each of the at least two fluid flow channels in the first porous component and in the second porous component extend continuously from the first end to the second end.

In some aspects, the at least two raised porous ribs in the first porous component are offset from the at least two fluid flow channels in the first porous component, and the at least two raised porous ribs in the second porous component are offset from the at least two fluid flow channels in the second porous component.

In typical aspects, each of the at least two raised fluid flow channels and/or each of the at least two raised porous ribs in the first porous component and in the second porous component are curved in shape between the first end and the second end. Channel curvature can remain at a constant pitch or can vary continuously along the length of a channel.

In typical aspects, each of the at least two raised fluid flow channels in the first porous component and in the second porous component have cross-sectional areas that change between the first end and the second end, preferably, wherein each of the at least two raised fluid flow channels in the first porous component and in the second porous component have cross-sectional areas that decrease from the second end to the first end.

In the preferred aspects, the ratio between the channel width at the first end to the channel width at the second end is greater than 1, and decreases going outward from the first end to the second end, advantageously keeping the fluid flow rate through the channel at a desirably high rate. For example, the ratio can be in the range from greater to 1 to about 8.

In a typical aspect, wherein each of the at least two raised fluid flow channels in the first porous component and in the second porous component have an open area in the respective lower surface or upper surface facing the drainage component.

A variety of fluid flow channel heights or depths are suitable for use in aspects of the invention. Typically, the height/depth is at least about 0.04;" in some aspects, in the range of from about 0.04" to about 0.125".

A variety of fluid flow channel widths are suitable for use in aspects of the invention. For example, in those aspects wherein each of the at least two raised fluid flow channels in the first porous component and in the second porous component have cross-sectional areas that decrease from the second end to the first end, the channel width to channel height/depth ratio at the first end is typically in the range of from about 0.12 to about 8, in some aspects, about 1.5

Porous components can have any number of fluid flow channels and/or raised porous ribs. Typically, the number of fluid flow channels is in the range of from 4 to about 120.

For efficient fluid flow, there is typically a space between adjacent filter disk segments, typically, a space between the exterior flat portions of the porous components of adjacent filter disk elements of the adjacent filter disk segments of at least about twice the height of the height of the raised channels and/or raised ribs on a single filter element disk.

Another aspect of the invention comprises a porous filter comprising at least two filter disk segments according to an aspect of the invention.

Another aspect of the invention comprises a filter device comprising a porous filter comprising at least two filter disk segments according to an aspect of the invention, the filter device comprising an inlet and an outlet and defining a fluid flow path between the inlet and the outlet, with the porous filter arranged in the housing across the fluid flow path.

A method of filtering fluid according to an aspect of the invention is also provided, the method comprising passing the fluid through at least one filter disk segment, preferably, at least two filter disk segments, more preferably passing the fluid through a filter device comprising at least two filter disk segments according to an aspect of the invention.

In one preferred aspect of a method for filtering fluid according to the invention, the fluid is passed from the outside of the filter disk segment(s) through the inside (e.g., through the central hub). Illustratively, in operation, a fluid is passed, into the filter disk segments through the top and bottom porous components (filtering media), forming a filtrate that is passed through the drainage component, and the filtrate passes along the fluid flow channels to the central hub and through the outlet of the filter device.

Advantageously, filter disk segments can be produced with fewer components while eliminating a manufacturing step. Additionally, increased effective filter area can be provided while preserving desirable residence time, without resulting in excess residence time that could degrade the filter media. Eliminating a component such as a separate slotted support plate reduces the disk segment height (thickness) allowing more disk segments to fit in the previously used housings, thus providing increased filtering efficiency. The use of raised fluid flow channels and/or raised ribs can provide additional effective filter areas compared to flat disks of media. Alternatively, or additionally, the raised fluid flow channels and/or raised ribs can provide spacing between adjacent filter disk segments, which can assist in efficient fluid flow.

Each of the components of the invention will now be described in more detail below, wherein like components have like reference numbers.

Figure 1A:
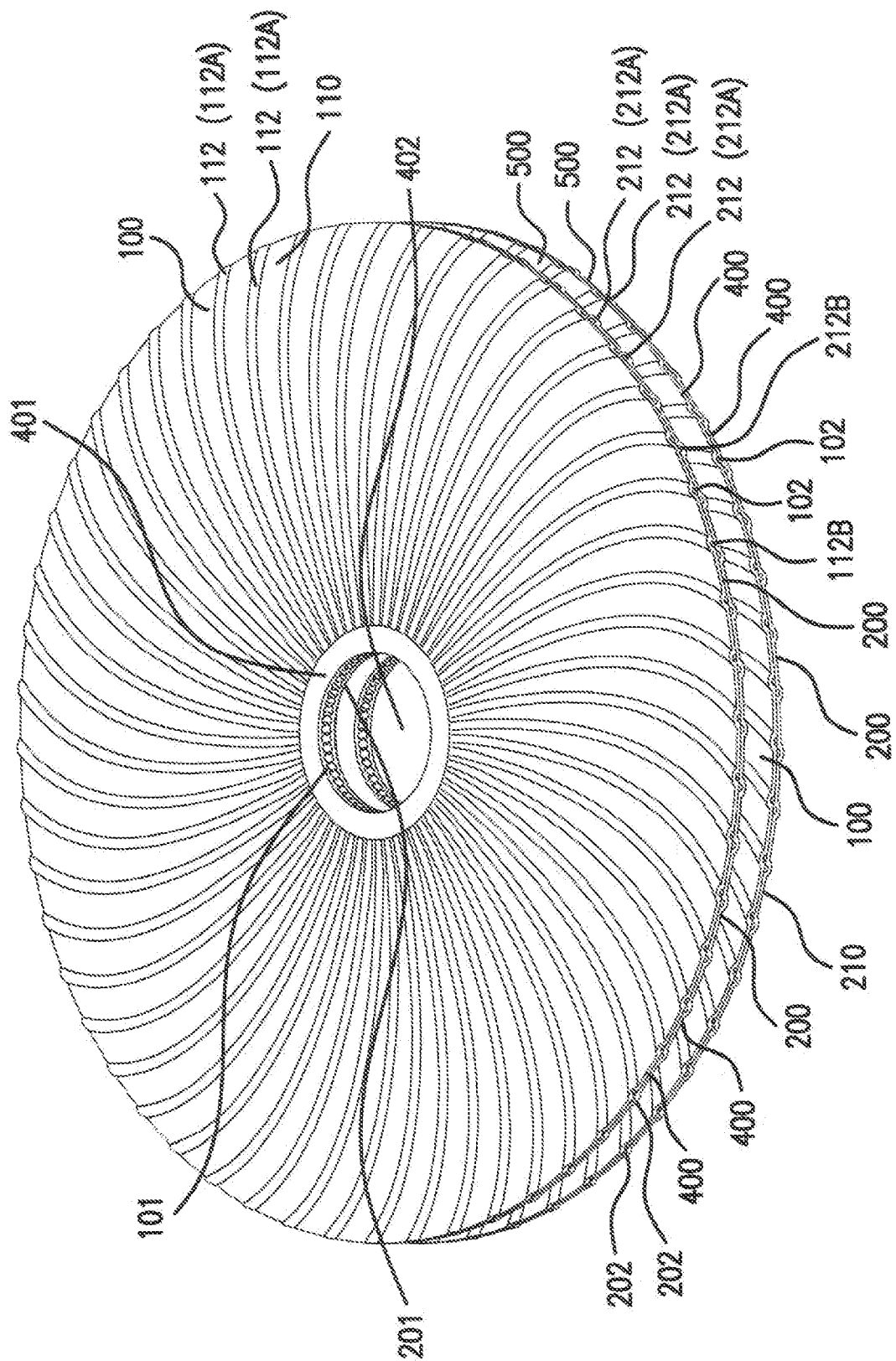
Figure 1B:
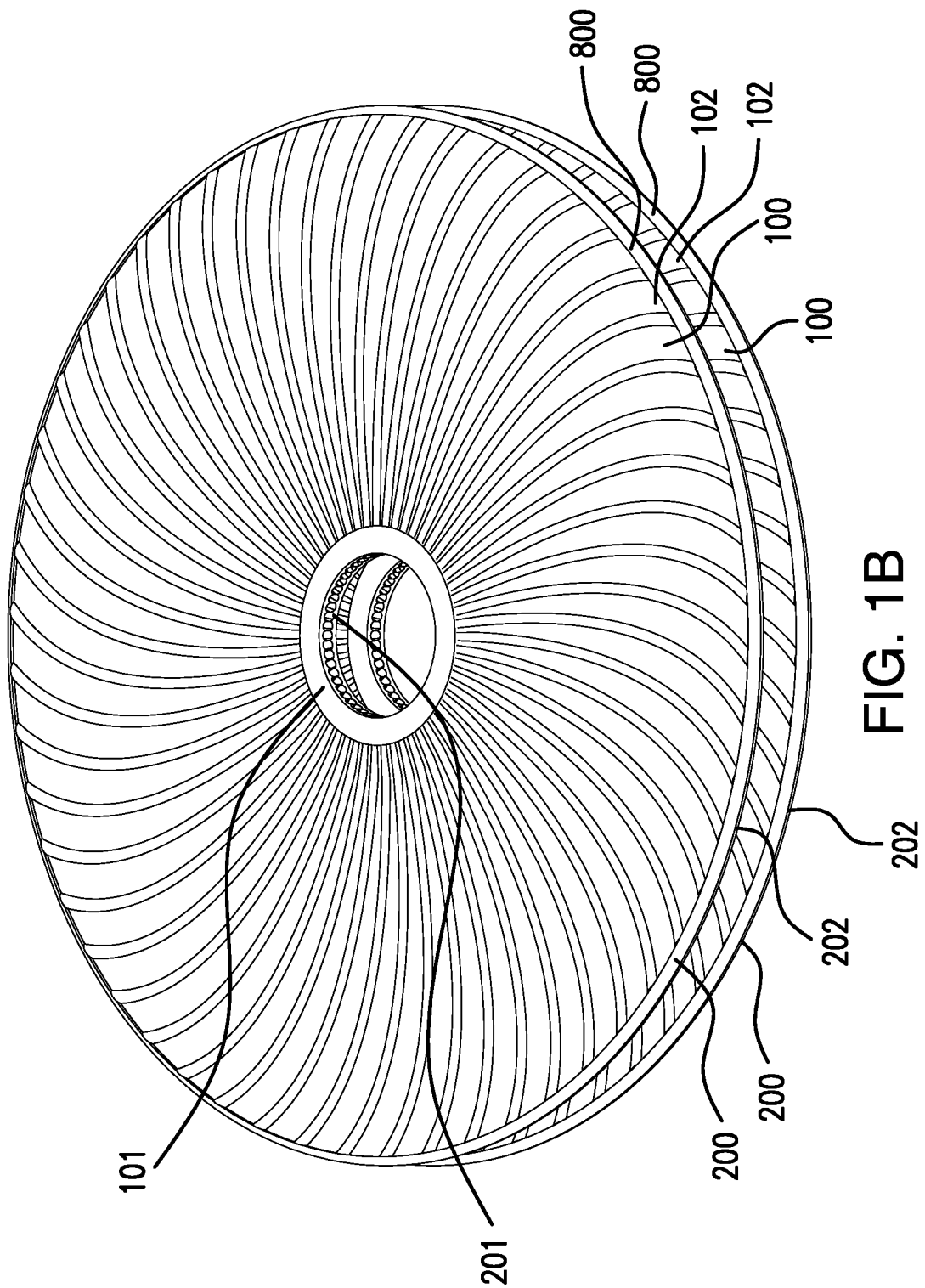
Figure 7:
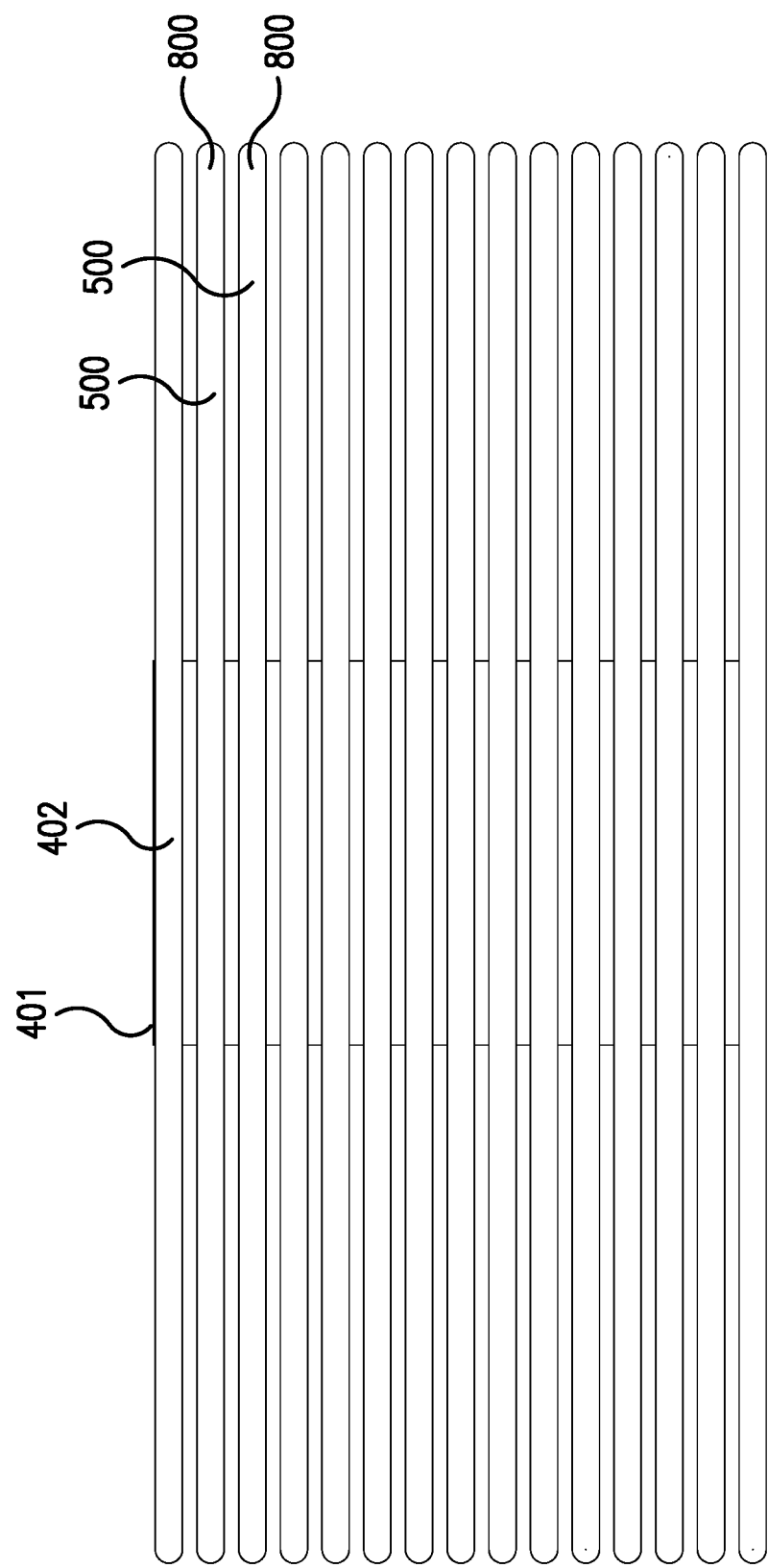
FIG. 7 shows filter disk segments sealed at the edges.

FIGS. 1A and 1B show a perspective view of two assembled filter disk segments 500 according to an aspect of the invention, each filter disk segment comprising a filter element disk 400 comprising a central hub 401 (in some embodiments the central hub is welded to the porous component) having a central hub opening 402; (i) a first porous component 100 including a first end 101 (that is open) by the central hub opening 402, wherein first end 101 is in fluid communication with the central hub opening 402, and a second end 102 distal to the first end, the first porous component having an upper surface 110 including at least two raised fluid flow channels 112 having porous walls 112A and inner diameters 112B (see FIG. 2A, also showing, with respect to fluid flow channel 112, upper surface 113, and lower surface 114 adjacent the upper surface 310 of drainage component 300), each of the at least two raised fluid flow channels extending toward the first end and the second end (illustrated as curved, and continuous from one end to the other), and a lower surface 120 facing (as shown in FIG. 5B) the upper surface 310 of a drainage component 300; (ii) a second porous component 200 including a first end 201 (that is open) by the central hub opening 402, wherein first end 201 is in fluid communication with the central hub opening 402, and a second end 202 distal to the first end, the second porous component having an upper surface 220, facing (as shown in FIG. 5B, see also, FIG. 4B) the lower surface 320 of the drainage component, and a lower surface 210 including at least two raised fluid flow channels 212 having porous walls 212A, each of the at least two raised fluid flow channels extending toward the first end and the second end (illustrated as curved, and continuous from one end to the other); (iii) the drainage component 300 (FIG. 5B) allowing fluid flow therethrough arranged between, and in fluid communication with, the first porous component and the second porous component, the drainage component including the central hub opening 402; wherein the central hub 401 supports the first porous component 100, the second porous component 200, and the drainage component 300. As shown in FIGS. 1B and 7, the edges of each filter disk segment are sealed (e.g., shown as weld 800) together.

Typically, the porous components are identical, and one porous component is inverted and the first and second porous components are placed together resulting in the fluid flow channels on the respective porous components curving in opposite directions. As will be discussed in more detail below, adjacent filter disk segments are arranged such that the filter element disc of a first filter disk segment has fluid flow channels curved in one direction and the filter element disc of the second filter disk segment (that faces the filter element disc of the first filter disk segment) has fluid flow channels curved in the other direction (see, FIG. 3A; see also, FIG. 5E showing the fluid flow channels in the upper and lower porous components of a filter disk segment curving in opposite directions).

FIG. 1C is an exploded view of two commercially available filter disk segment. In contrast with the aspect of the filter disk segments 500 shown in FIGS. 1A and 1B, wherein each segment has two porous components and a single drainage component between the porous component, each commercially available filter disk segment has two layers of porous media, two layers of mesh, a slotted support, and a separate intersegment spacer is present between adjacent segments.

Figure 2A:
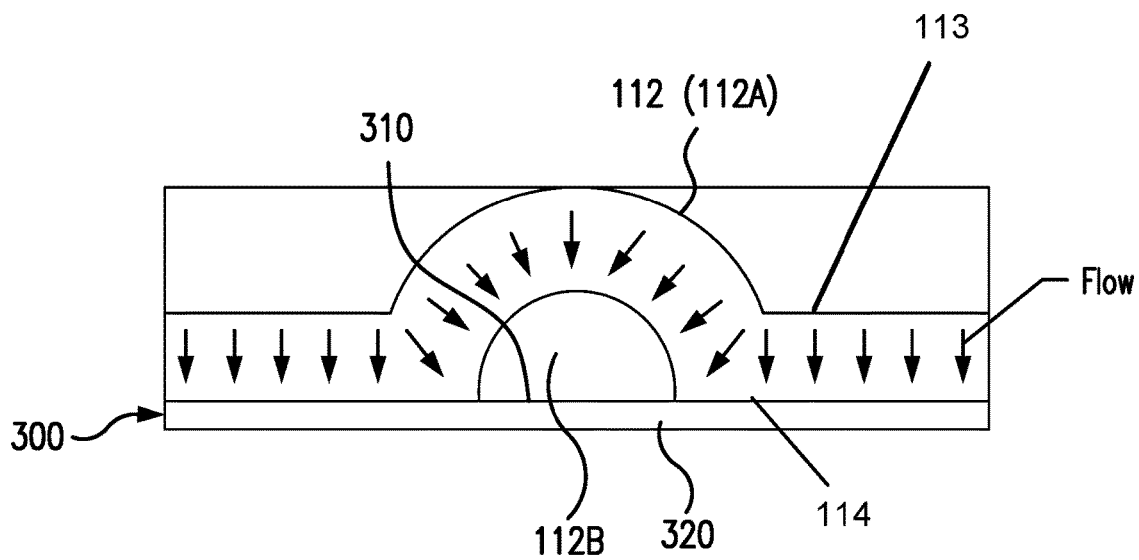
Figure 2B:
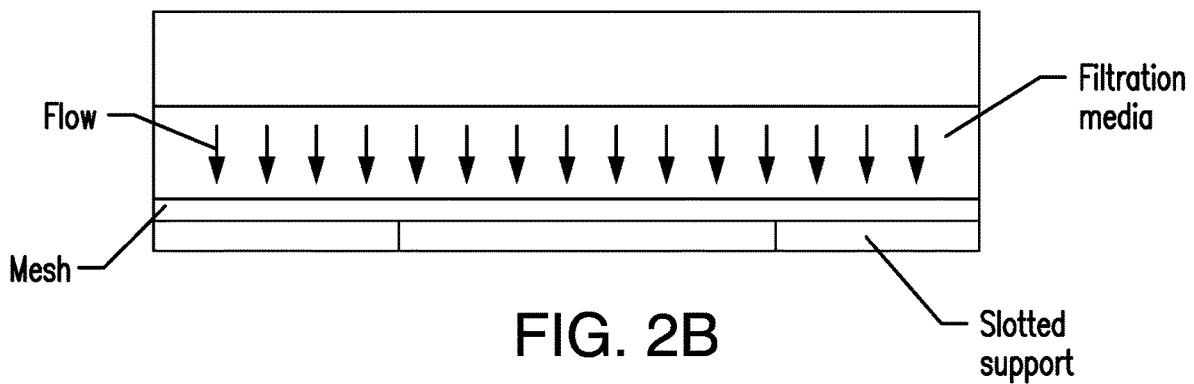

FIG. 2A shows fluid flow through the porous wall 112A of the raised flow channel 112 having an inner diameter 112B according to the aspect of the filter disk segment shown in FIG. 1A (212A, 212, 212B arranged the same way), illustrating fluid flow accessing more filter surface area before passing through drainage component 300, in contrast with, as shown in FIG. 2B, fluid flow through the porous media of the commercially available filter disk segment, wherein the fluid flow accesses less filter surface area.

Figure 3A:
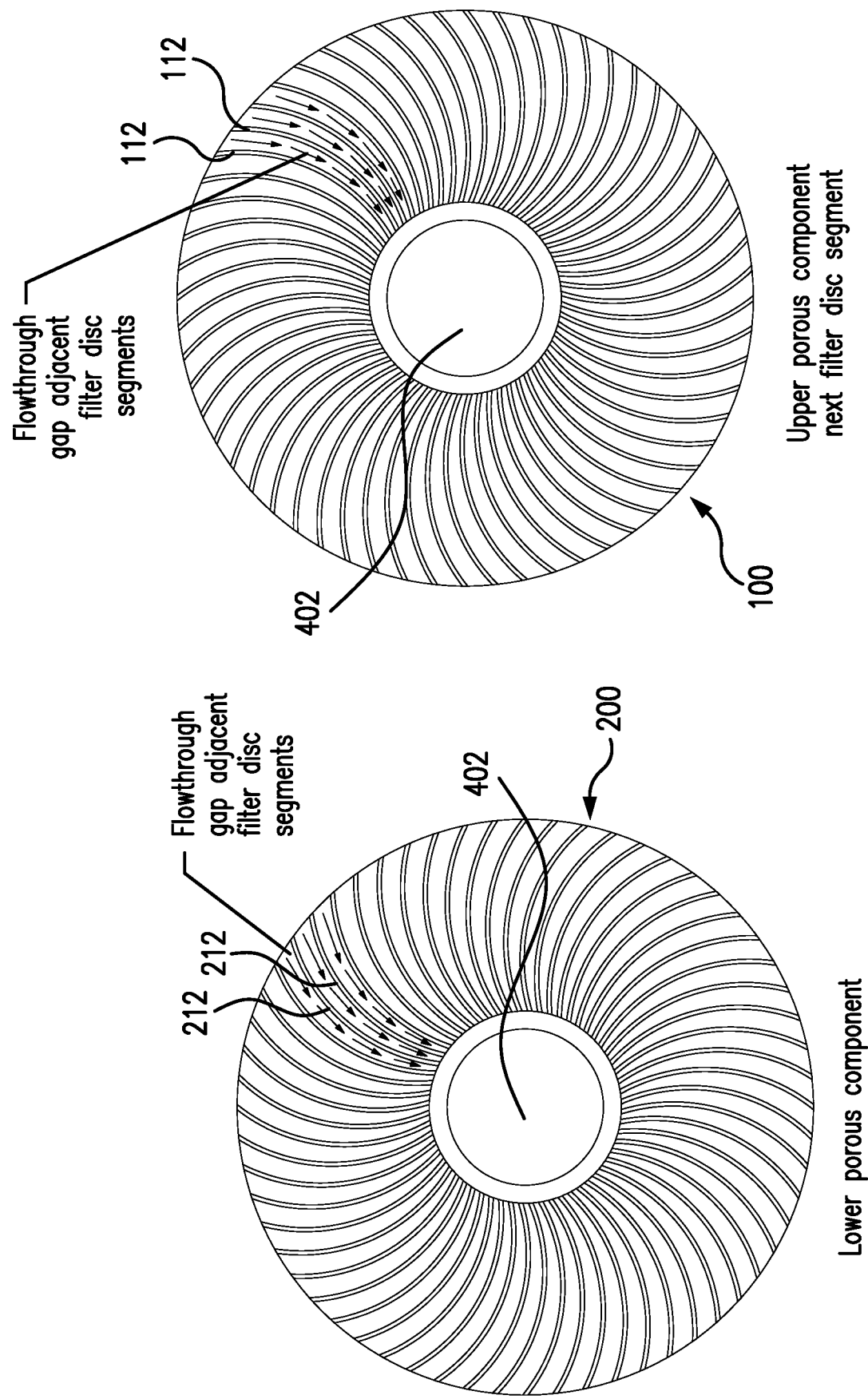
Figure 3B:
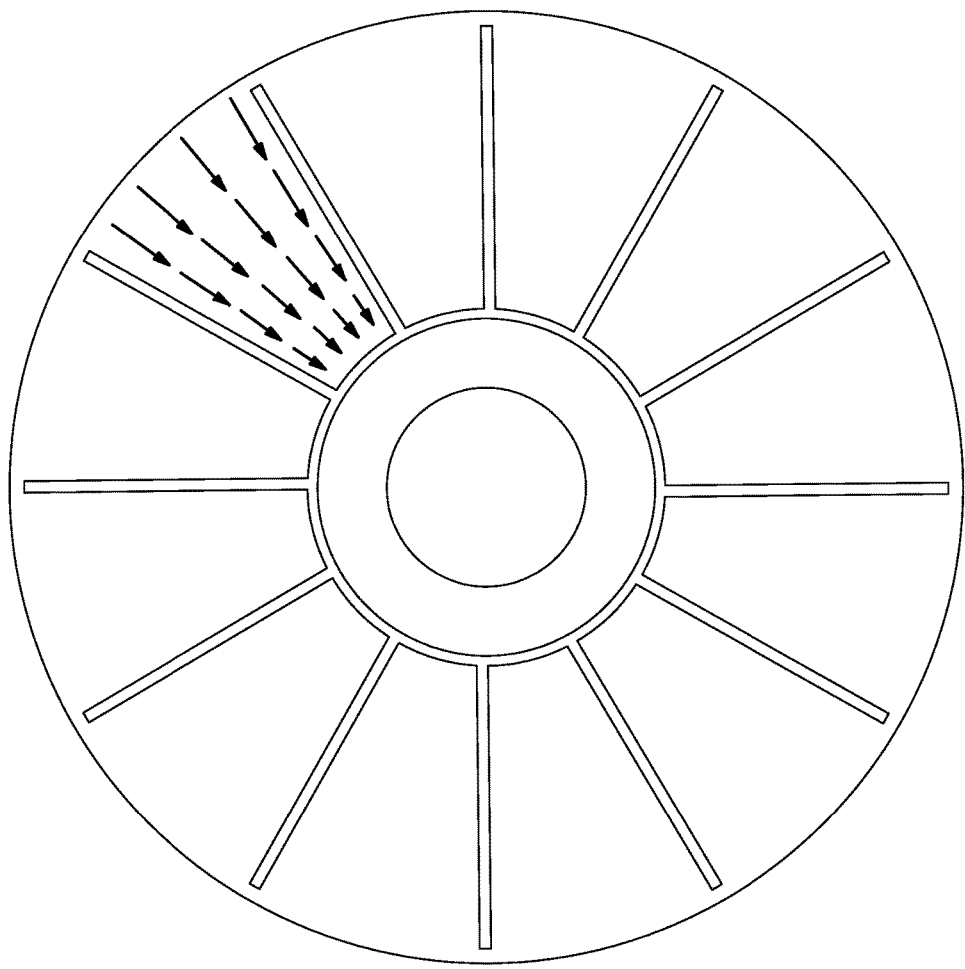

FIG. 3A is a diagrammatic view showing fluid flow through the gap between adjacent filter disk segments 500 (between the lower porous component of one filter disc segment and the upper porous component of the next filter disc segment, the porous component having flow channels curved in opposite directions) before passing through the porous components (filter media) 100, 200 according to an aspect of the invention, also showing less flow area due to raised fluid flow channels 112, 212 (the raised flow channels take up space and reduce flow volume in the gap between filter disk segments), resulting in lower residence time in the gap, thus minimizing polymer burning; FIG. 3B is a diagrammatic view showing fluid flow through the gap between adjacent filter disk segments due to the spacer between adjacent filter disk segments before passing through the filter media in a commercially available filter disk segment, wherein an increased residence time can result in increased polymer burning.

Figure 4A:
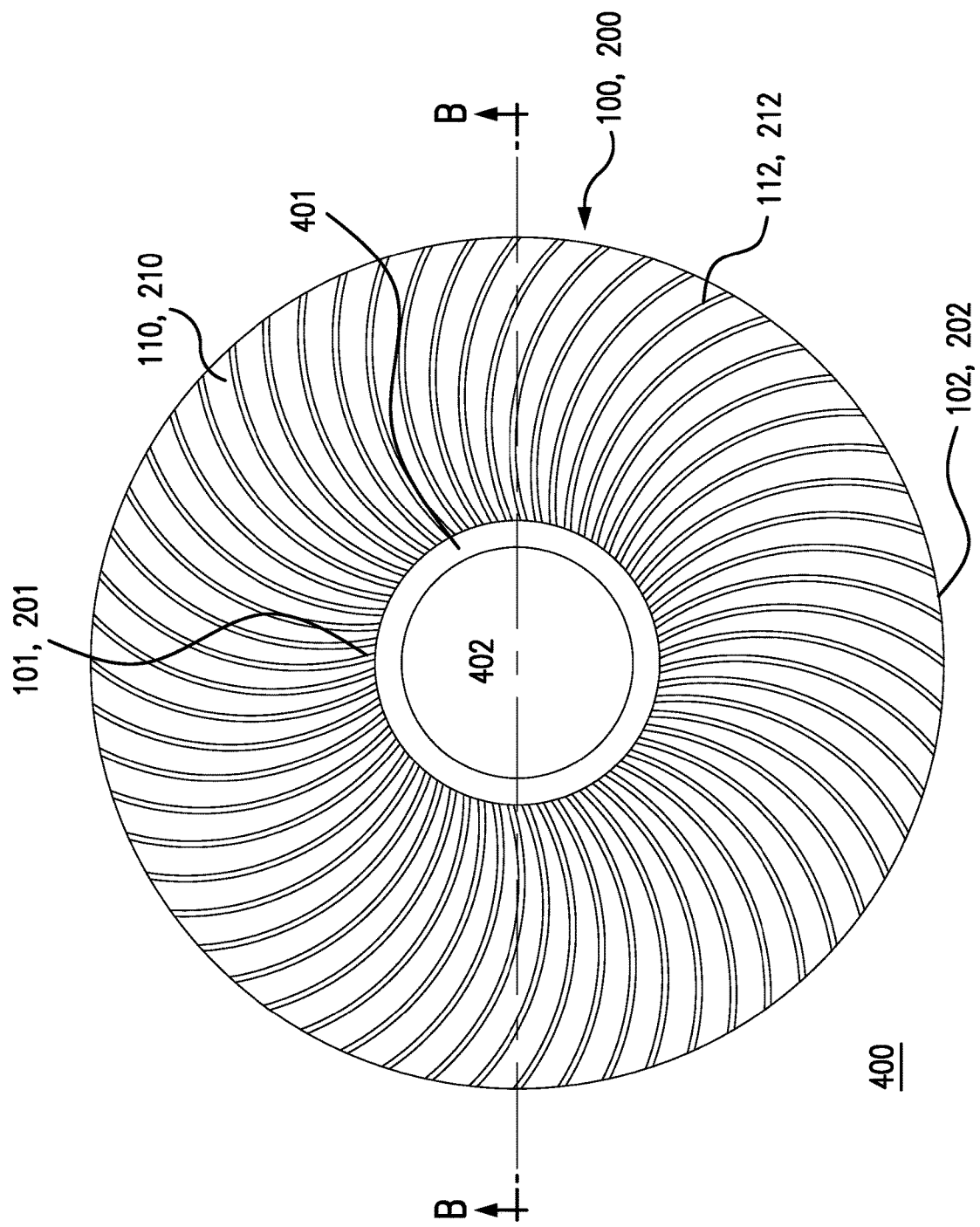
Figure 4B:
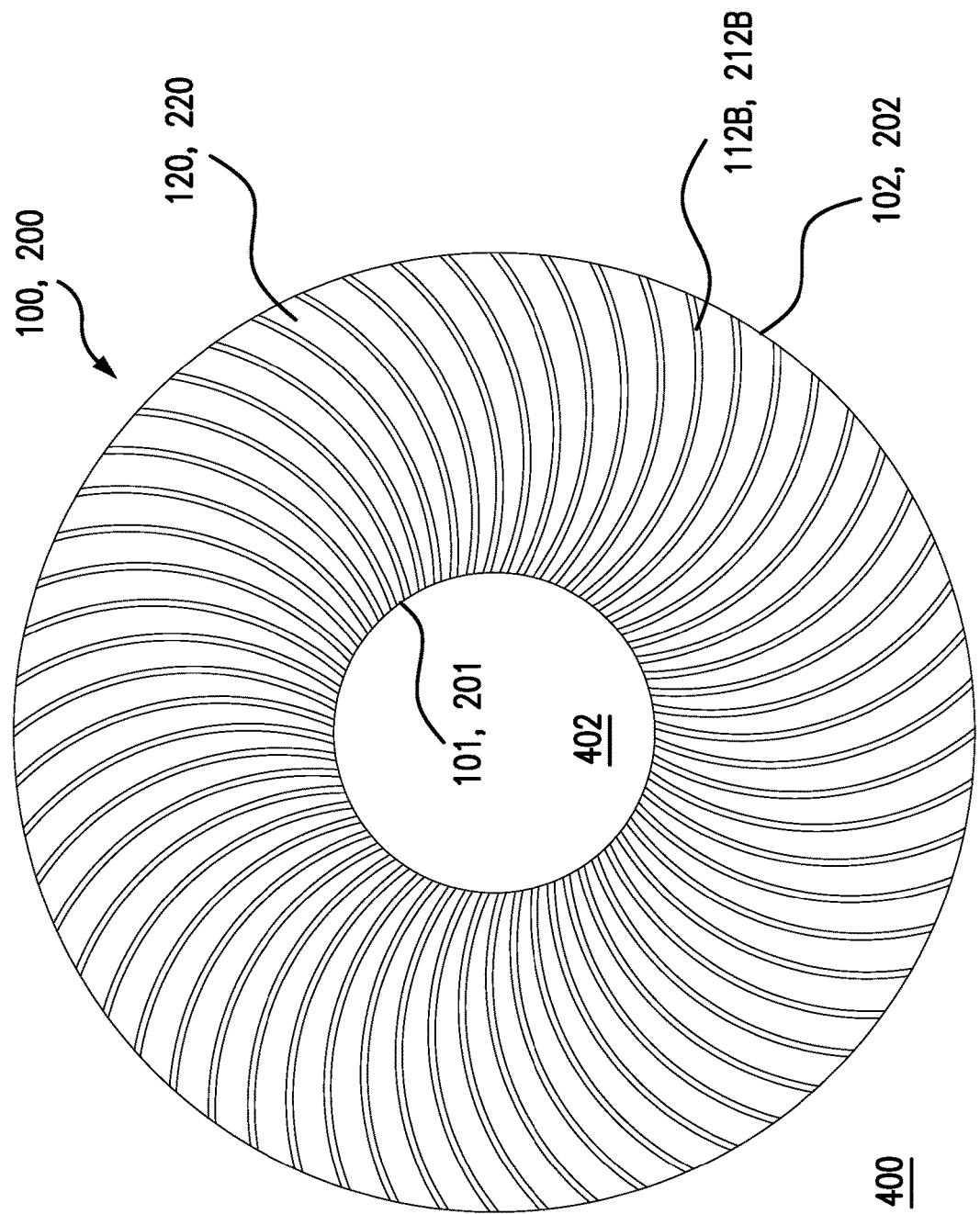

FIG. 4A is a top view of a porous component 100, 200 of a filter element disk 400 according to an aspect of the invention.

Figures 4C, 4D:
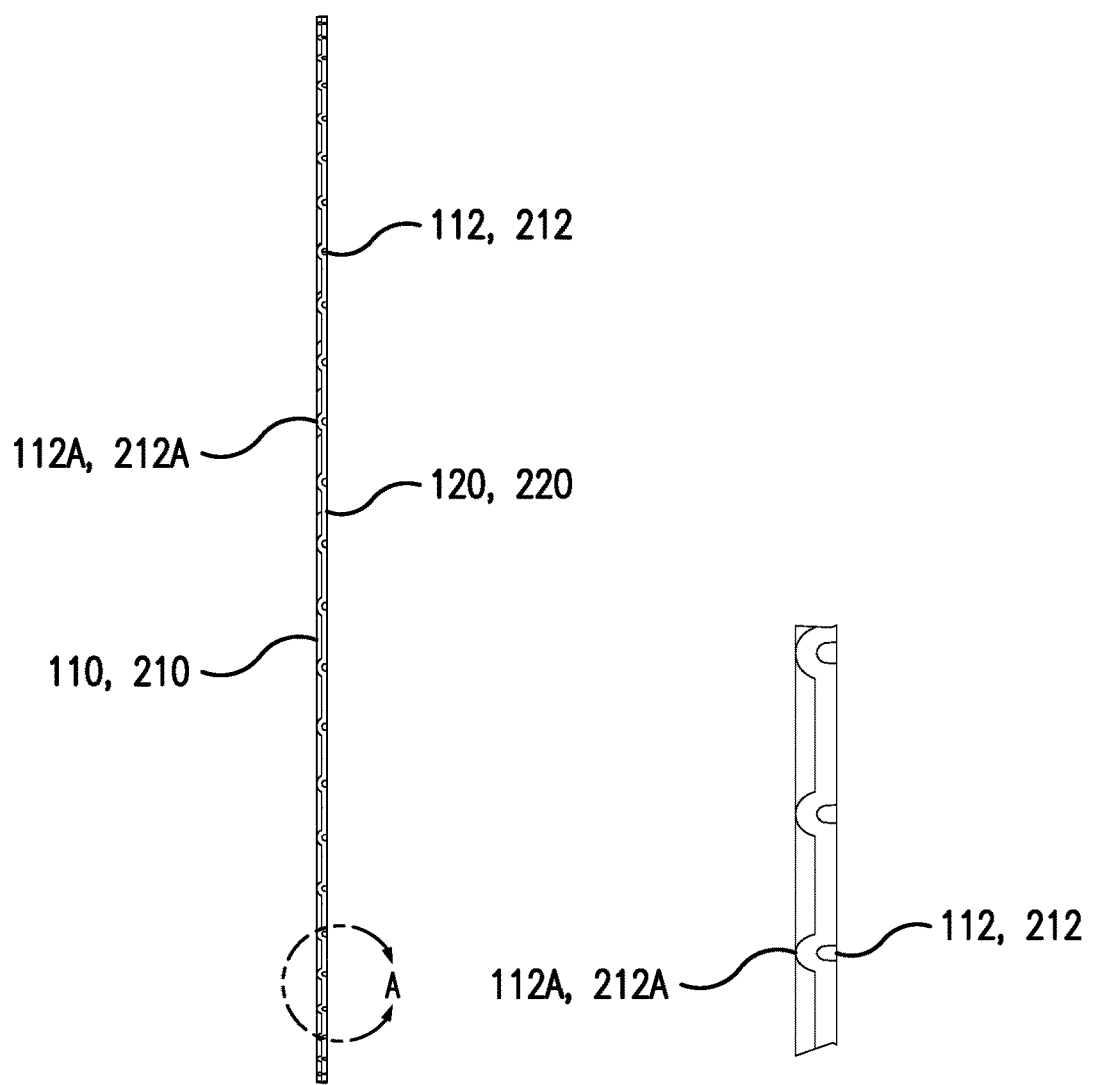
Figure 4E:
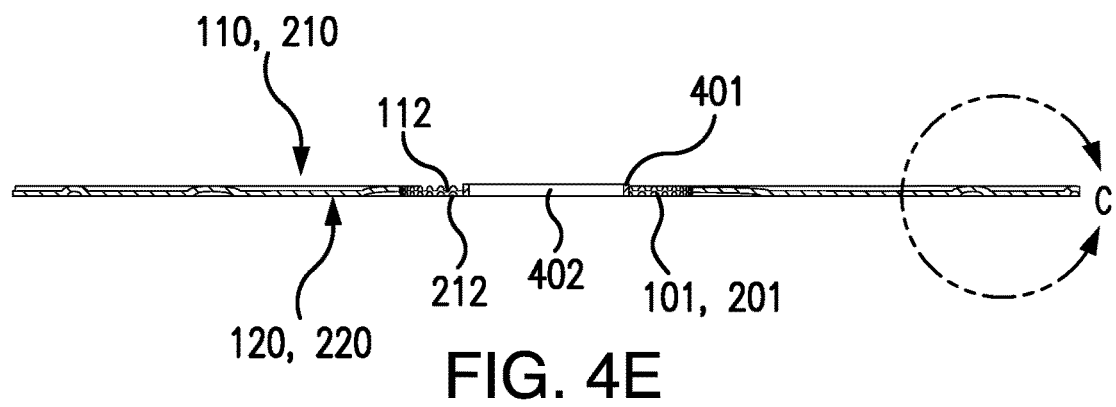

In typical aspects, each of the at least two raised fluid flow channels in the first porous component and in the second porous component have cross-sectional areas that change between the first end and the second end, preferably, wherein each of the at least two raised fluid flow channels in the first porous component and in the second porous component have cross-sectional areas that increase from the second end to the first end. FIG. 4B is a bottom view of the aspect of the porous component 101, 201 of the filter element disc 400 shown in FIG. 4A, also showing the respective surfaces 120, 220, and the cross-sectional areas of the fluid flow channels 112 (112B), 212 (212B) increasing from the second (outer) end 102, 202 of the element disk toward the first (inner) end 101, 201 by the central hub opening 402; FIG. 4C is a side view of the aspect of the porous component of a filter element disk shown in FIG. 4A; FIG. 4D is an enlarged view of region "A" shown in FIG. 4C; and FIG. 4E is a cross-sectional view along line B-B of the porous component of the filter element disk shown in FIG. 4A, also showing central hub 401, central hub opening 402, and the ends of flow channels 112, 212 at the first (inner) ends 101, 201.

Figure 5A:
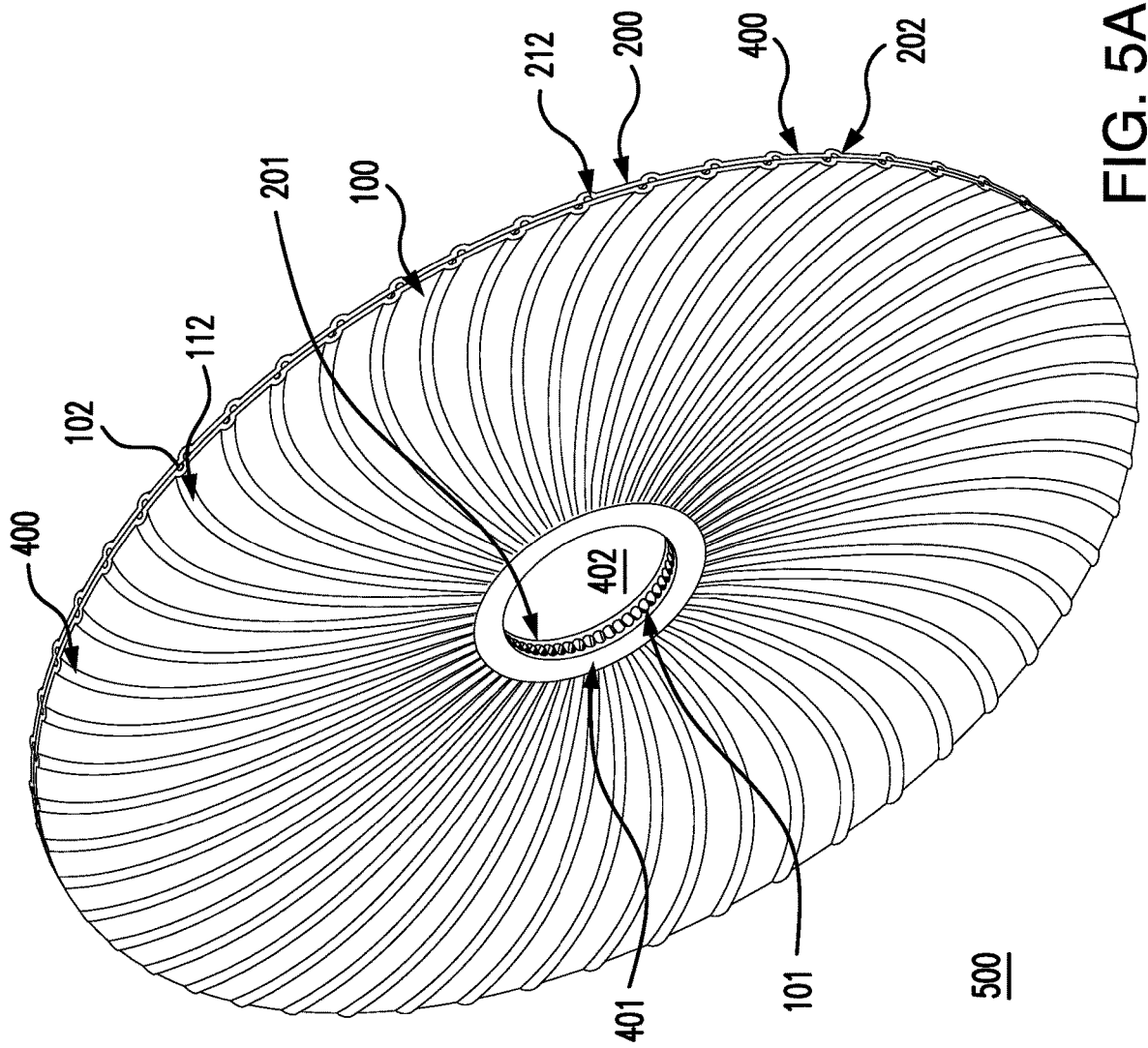
Figure 5B:
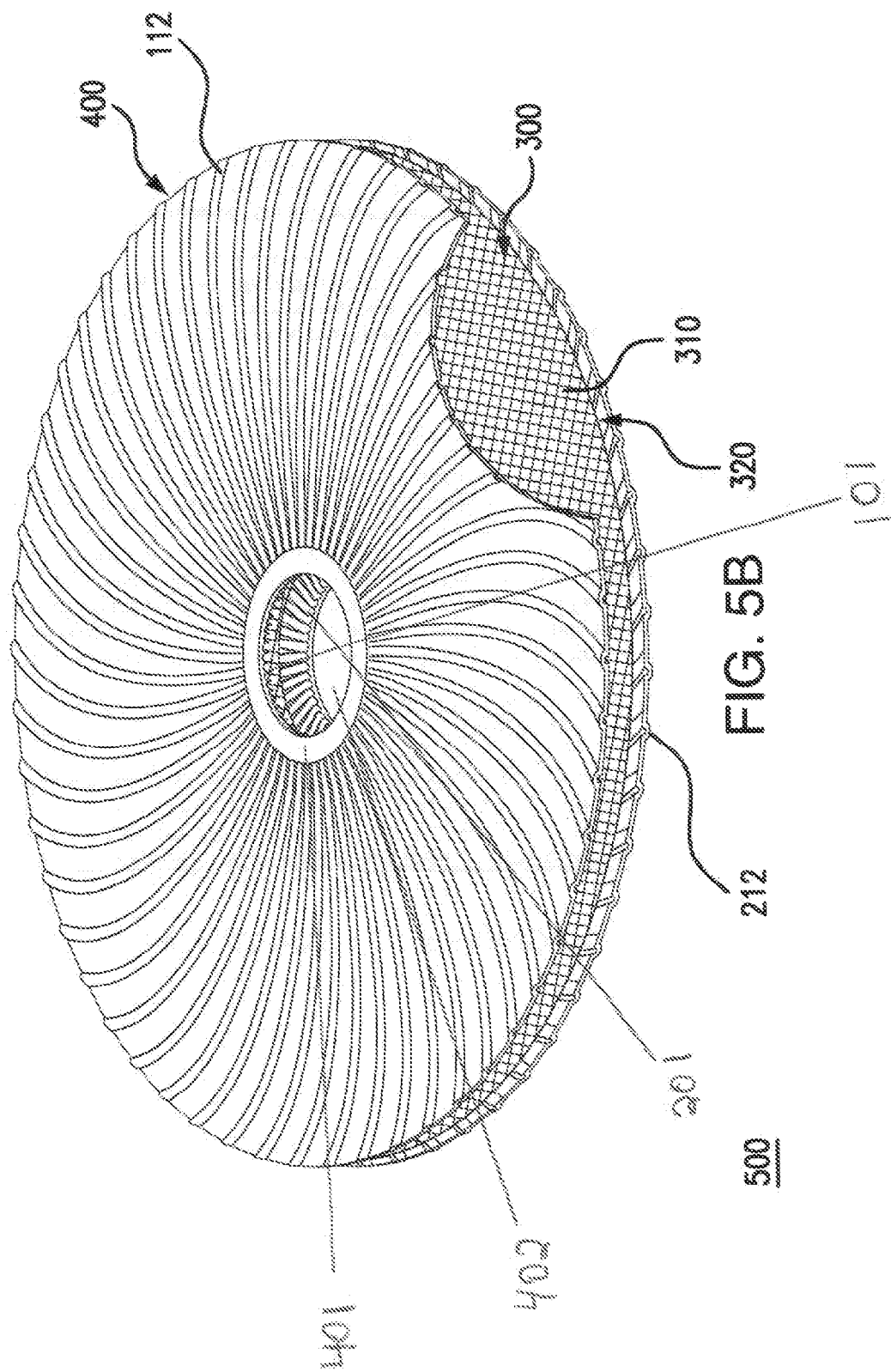
Figure 5C:
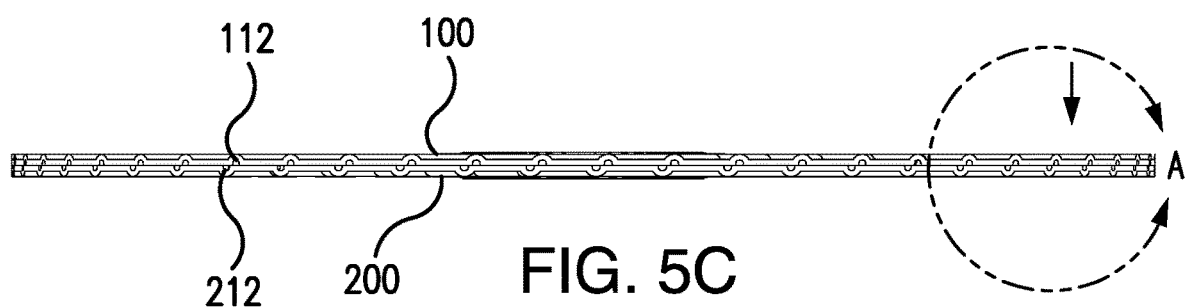
Figure 5D:
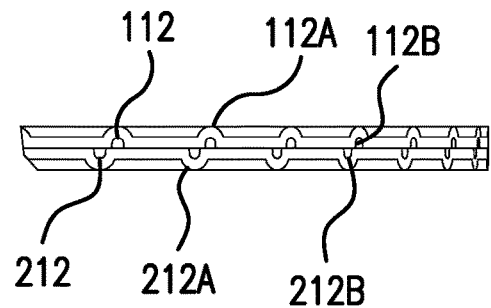
Figure 5E:
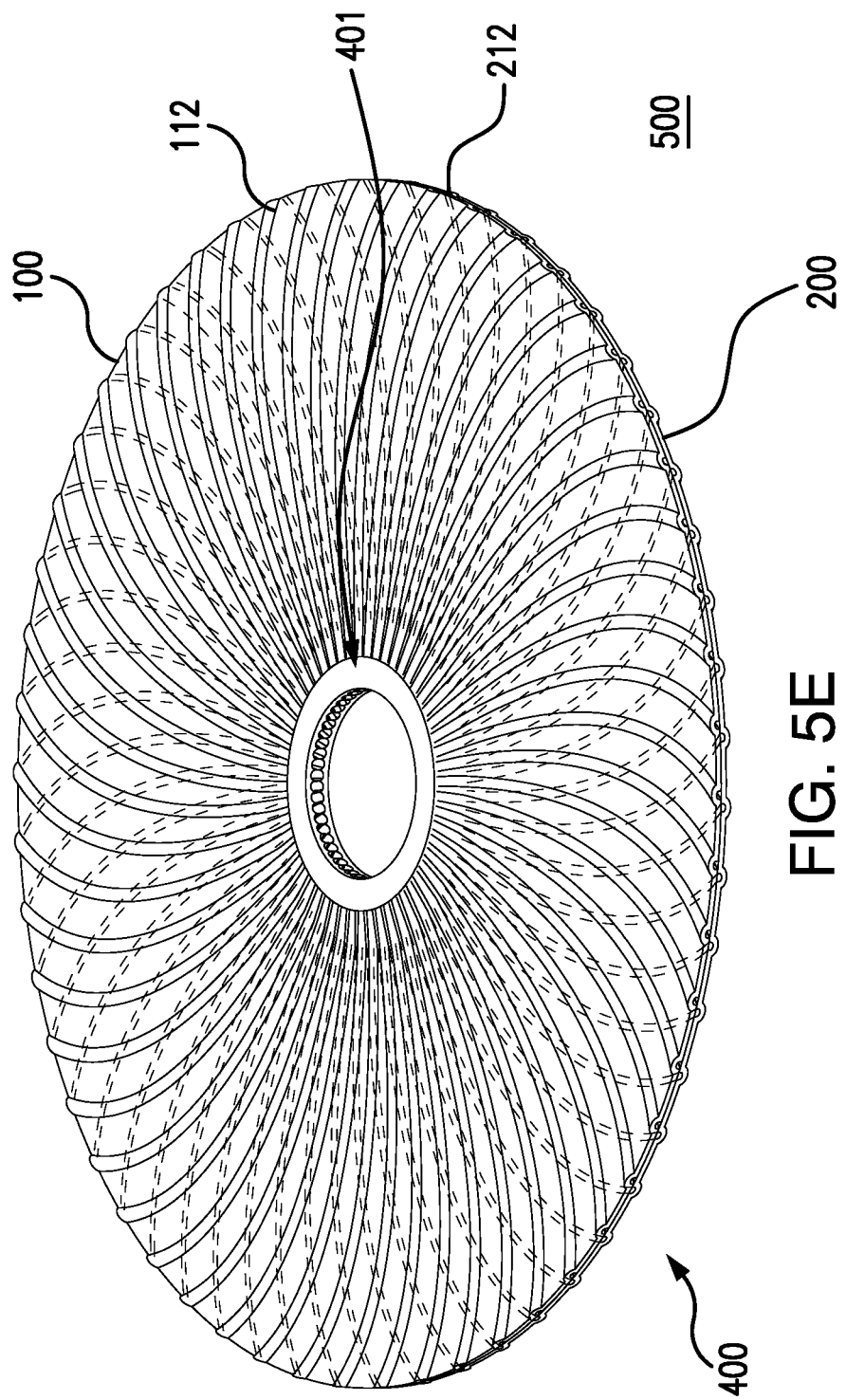

FIGS. 5A and 5B are isometric top views of a filter disk segment 500 including filter element disk 400 according to an aspect of the invention including porous components 100, 200 and central hub 401 (also showing also showing central hub opening 402 and first ends 101 and 201 that are open see, FIGS. 1A, 1B, and FIG. 5B), wherein the central hub or hubs are welded to the porous components, the drainage component 300 (as shown in FIG. 5B) having a upper surface 310 and a lower surface 320, welded edge of filter disk segment not shown; FIG. 5C is a side view of the filter disk segment shown in FIG. 5A; FIG. 5D is an enlarged view of region "A" shown in FIG. 5C, showing the respective fluid flow channels 112 and 212 are offset from each other. Preferably, the first and second porous components are identical, so when placed on opposite sides of the drainage component in forming a filter disk segment, the fluid flow channels 112, 212 in the respective porous components 100, 200, are curved in opposite directions, as shown in FIG. 5E (wherein fluid flow channels 212 are shown through porous component 100 in broken lines).

Figure 6A:
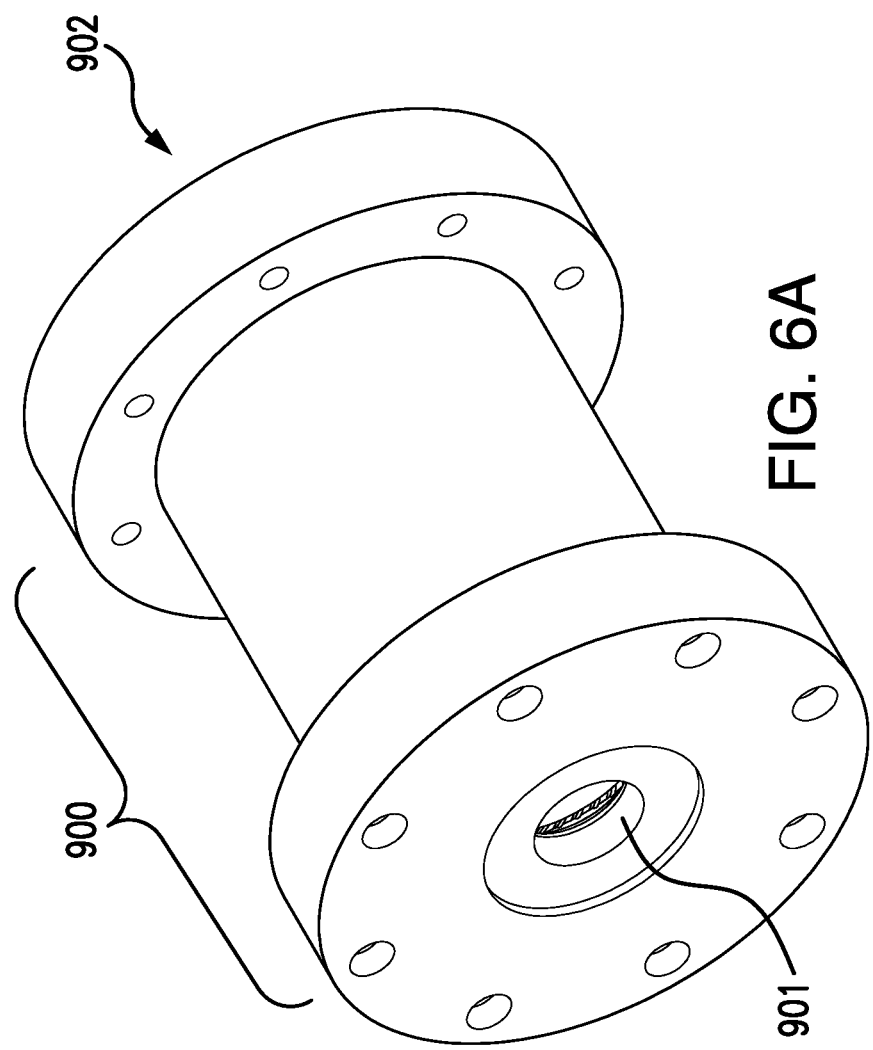
FIG. 6A is a perspective view of a filter device including a housing and a filter unit comprising porous filter comprising plurality of disk segments arranged on a hollow aperture central core between end caps wherein the filter unit is arranged in the housing according to an aspect of the invention.
Figure 6B:
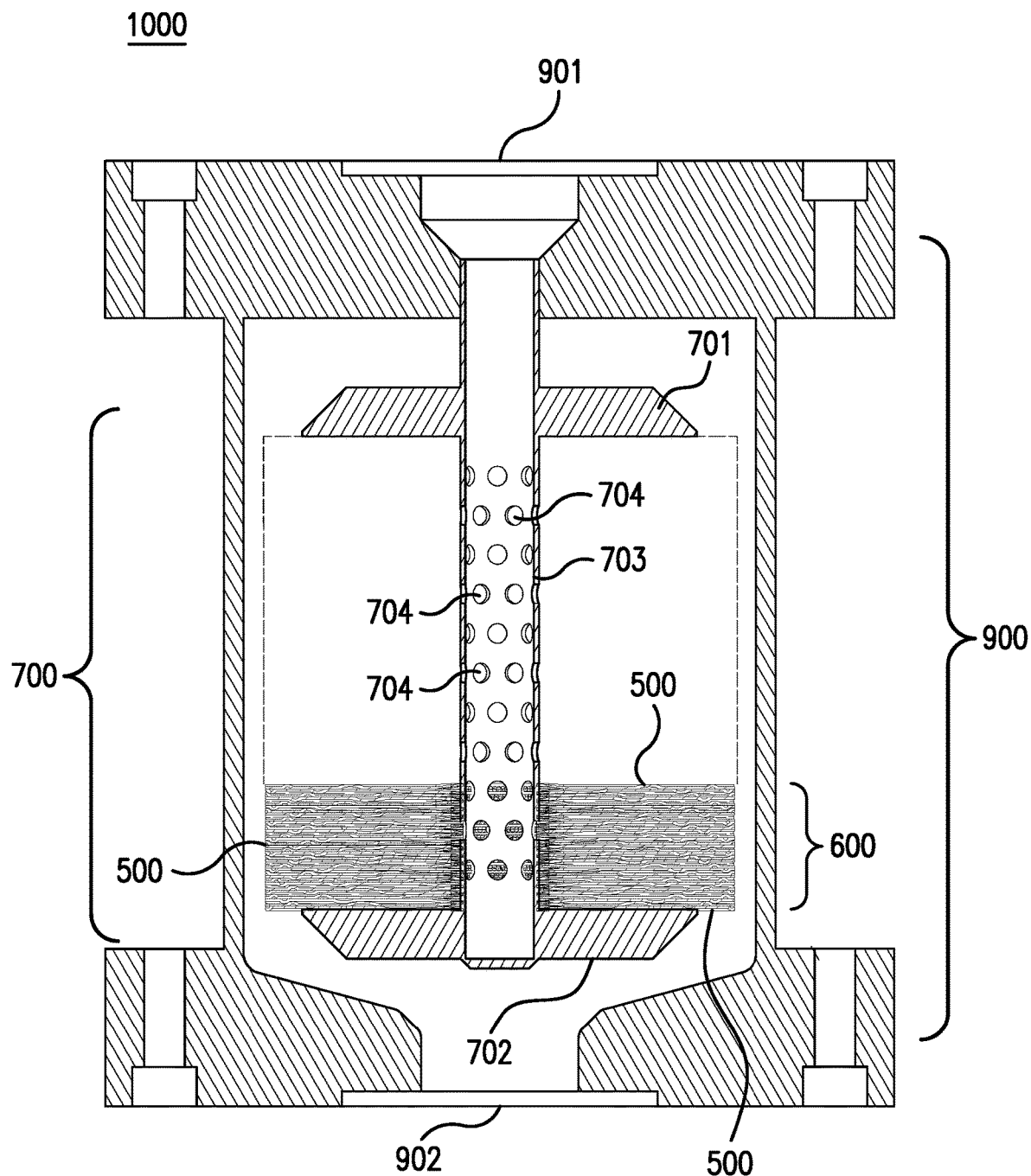
FIG. 6B is a cross-sectional view of the device shown in FIG. 6A.

FIG. 6A is a perspective view of an aspect of a filter device 1000 including a housing 900 having an inlet 901 and an outlet 902, and, as shown in the cross-sectional view of the device in FIG. 6B, a filter unit 700 comprising porous filter 600 comprising plurality of disk segments 500 (or 500' as described below) arranged on a hollow perforated central core 703 (perforations 704) between end caps 701 (open end cap), 702 (closed end cap) wherein the filter unit is arranged in the housing according to an aspect of the invention.

FIG. 7 shows a plurality of filter disk segments 500 (or 500' as described below) forming porous filter 600 (arranged for outside to inside fluid flow and through the central hub of the disk segments), also showing space between adjacent filter disk segments, wherein each filter disk segment is sealed (e.g., welded) at the edges.

FIG. 8A is an isometric top view of first and second porous component 100', 200' of filter element disk 400' providing a filter disk segment 500' according to another aspect of the invention (drainage component not shown between porous components 100' and 200'), having first (inner) ends 101', 201' and second (outer) ends 102', 202' and including a plurality of raised porous ribs 115, 215 (with respective porous walls 115A, 215A) on one surface 110', 210', and a plurality of fluid flow channels 116, 216 with porous walls 116A, 216A and having inner diameters 116B, 216B in the other surface 120', 220,' wherein the fluid flow channels 116, 216 are offset from each other at the second ends 102', 202'; FIG. 8B is an enlarged view of region "A" (showing a single porous component representing the first and second porous components) including the first ends 101', 201' shown in FIG. 8A; and FIG. 8C is an enlarged view of region "B" (showing a single porous component representing the first and second porous components) including the second ends 102', 202' shown in FIG. 8A. Typically, the first and second porous components are identical, so when placed on opposite sides of the drainage component in the respective porous components curved in opposite directions) the flow channels are slightly or completely offset from each other the second ends, though they can be aligned at the second ends if desired.

Advantageously, the raised porous ribs can assist in providing spacing between adjacent filter element disks.

FIG. 9A is a perspective view of an assembled filter disk segment 500' including porous components as shown in FIG. 8A, wherein the fluid flow channels 116, 216 are slightly offset from each other with some overlap at the second ends 102', 202'; FIG. 9B is an enlarged view of region "A" shown in FIG. 9A; and FIG. 9C is an enlarged view of region "B" shown in FIG. 9A.

The porous components can have any suitable pore structure, e.g., a pore size (for example, as evidenced by bubble point, or by $K_L$ as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating. The pore structure used depends on the size of the particles to be utilized, the composition of the fluid to be treated, and the desired effluent level of the treated fluid.

Typically, the porous components 100, 200, 100', 200' each have a pore size in the range from about 0.5 microns to about 100 microns.

The drainage component 300, that can also provide support, is typically configured as a mesh or screen, having openings larger than the pore structure of the porous components. Preferably, the drainage component pressure drop of the drainage component is about 10% or less than the porous component pressure drop.

A filter disk segment can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869.

The filter disk segment, preferably at least two filter disk segments, is/are typically disposed in a housing comprising at least one inlet and at least one outlet and defining at least one fluid flow path between the inlet and the outlet, wherein the filter disk segments) is/are across the fluid flow path, to provide a filter device. Preferably, the filter device is sterilizable. Any housing of suitable shape and providing at least one inlet and at least one outlet may be employed.

In some aspects, a filter unit comprises a porous filter comprising at least two filter disk segments. Optionally, the filter unit comprises a hollow aperture core. In some aspects, the filter unit further comprises end caps, and the filter unit is arranged in the filter device filter housing across the fluid flow path.

Porous components according to aspects of the invention are preferably monolithic, preferably manufactured via additive manufacturing (sometimes referred to as "additive layer manufacturing" or "3D printing"). They are typically formed by repeated depositions of a metal powder bound together with an activatable binder (e.g., binder jetting, sometimes referred to as "drop on powder"), typically followed by agglomerating the powder, e.g., by sintering.

Any suitable additive manufacturing equipment can be used, and a variety of production 3D printers are suitable and commercially available.

The following examples further illustrate the invention but, of course, should not be construed as in any way limiting its scope.

Example 1

This example demonstrates the simulated performance of a filter disk segment according to an aspect of the invention in comparison to a commercially available filter disk segment having a separate slotted disk between the filter media, using a fixed upstream pressure.

A 12 inch nominal filter disk segment as generally shown in FIGS. 5A and 5B, having 54 fluid flow channels, about 0.08 media thickness and about 0.10 inch channel width at the hub in each filter element disc, and a commercially available filter disk segment (LEAF DISK, Pall Corporation, East Hills, NY) as generally shown in FIG. 1C, are tested, using clean polyethylene terephthalate (PET) fluid and 522 psi upstream pressures.

The results are as follows:

|  | Aspect of invention | Commercially Available |  |
|---|---|---|---|
| Downstream pressure (psi) | 0 | 0 | Same inlet and outlet pressures |
| Flow rate into disc segment (mL/min.) | 217 | 191 | Approx 15% higher |
| Maximum residence time (min.) | 3.5 | 5.0 | Lower residence time |
| Channel pressure (halfway down) (psi) | 55 | 59 | Similar |
| Pressure drop across media at OD (psi) | 446 | 443 | Similar |
| Pressure drop across media at hub (near ID) (psi) | 513 | 506 | Similar |
| Height of 1 disc (in.) | .286 | .342 | Greater number of discs can be fit into the same housing |

The results show a filter disc segment according to an aspect of the invention can provide a higher flow rate, reduced residence time, and allow an increased number of discs fit into the same housing in comparison to a commercially available disc segment with similar pressures and pressure drops.

Example 2

This example demonstrates the simulated performance of a filter disk segment according to an aspect of the invention in comparison to a commercially available filter disk segment having a separate slotted disk between the filter media, using a fixed flow rate of 200 mL/min.

The tested filter disk segments and test fluid are as described in Example 1.

The results are as follows:

|  | Aspect of invention | Commercially Available |  |
|---|---|---|---|
| Downstream pressure (psi) | 0 | 0 |  |
| Upstream pressure (psi) | 459 | 546 | Approx 15% lower |
| Maximum residence time (min.) | 3.31 | 5.0 | Lower residence time |
| Channel pressure (halfway down) (psi) | 50 | 57 | Similar |
| Pressure drop across media at OD (psi) | 379 | 463 | Lower pressure drop |
| Pressure drop across media at hub (near ID) (psi) | 448 | 532 | Lower pressure drop |
| Height of 1 disc (in.) | .286 | .342 | Greater number of discs can be fit into the same housing |

The results show a filter disc segment according to an aspect of the invention can provide a lower downstream pressure, reduced residence time, lower pressure drops and allow an increased number of discs fit into the same housing in comparison to a commercially available disc segment in a test with a similar flow rate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of at least two of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter disk segment comprising:
a cylindrical ring having planar upper and lower surfaces, and a plurality of orifices radially extending from an interior surface of the cylindrical ring to an exterior surface of the cylindrical ring placing the interior of the cylindrical ring in fluid communication with the exterior of the ring;
a planar drainage component radially extending from the exterior surface of the cylindrical ring, defining a circular periphery;
a first porous component coextensively contacting and covering a surface of the planar drainage component, extending from the exterior surface of cylindrical ring to beyond the circular periphery of the planar drainage component; and
a second porous component coextensively contacting and covering the opposing surface of the planar drainage component, extending from the exterior surface of the cylindrical ring to beyond the circular periphery of the planar drainage component, the first and second porous components being sealed together along the circular periphery;
wherein the cylindrical ring supports the first porous component, the second porous component, and the planar drainage component;
wherein each of the first and second porous components include a plurality of raised, curved, fluid flow channels defined by portions of the first and second porous components which are spaced from the planar drainage component, the fluid flow channels extending continuously from the exterior surface of the cylindrical ring to the circular periphery; and
wherein, a fluid to be filtered passes the through first and second porous components, forming a filtrate that is passed through the drainage component, and along the plurality of raised, curved, fluid flow channels, to and through the plurality of orifices to the interior of the cylindrical ring.

2. The filter disk segment of claim 1, wherein, each of the plurality of raised, curved, fluid flow channels in the first porous component and in the second porous component have cross sectional areas that vary along their length.

3. The filter disk segment of claim 1, wherein, the curvature of each of the plurality of raised, curved, fluid flow channels remains at a constant pitch along their length.

4. The filter disk segment of claim 1, wherein, the curvature of each of the plurality of raised, curved, fluid flow channels varies continuously along their length.

5. The filter disk segment of claim 1, wherein, the plurality of raised, curved, fluid flow channels in the first porous component are offset from the plurality of raised, curved, fluid flow channels in the second porous component.

6. A filter device comprising:
a housing having an inlet and an outlet; and
at least two filter disk segments as recited in claim 1 being disposed within the housing and the cylindrical rings are sealingly stacked along respective planar upper and lower surfaces, wherein the interior within the stacked cylindrical rings is in fluid communication with the outlet, permitting egress of filtrate.

7. A method of filtering a fluid comprising:
providing a filter device including:
a housing having an inlet and an outlet; and
at least two filter disk segments, each of the at least two filter disk segments including:
a cylindrical ring having planar upper and lower surfaces, and a plurality of orifices radially extending from an interior surface of the cylindrical ring to an exterior surface of the cylindrical ring placing the interior of the cylindrical ring in fluid communication with the exterior of the ring;
a planar drainage component radially extending from the exterior surface of the cylindrical ring, defining a circular periphery;
a first porous component coextensively contacting and covering a surface of the planar drainage component, extending from the exterior surface of cylindrical ring to beyond the circular periphery of the planar drainage component; and
a second porous component coextensively contacting and covering the opposing surface of the planar drainage component, extending from the exterior surface of the cylindrical ring to beyond the circular periphery of the planar drainage component, the first and second porous components being sealed together along the circular periphery;
wherein the cylindrical ring supports the first porous component, the second porous component, and the planar drainage component;
wherein each of the first and second porous components include a plurality of raised, curved, fluid flow channels defined by portions of the first and second porous components which are spaced from the planar drainage component, the fluid flow channels extending continuously from the exterior surface of the cylindrical ring to the circular periphery; and
wherein the at least two filter disk segments are disposed within the housing and the cylindrical rings are sealingly stacked along respective planar upper and lower surfaces, wherein the interior within the stacked cylindrical rings is in fluid communication with the outlet;
flowing a fluid to be filtered into the inlet, through at least one of the filter disk segments, and into the interior within the stacked cylindrical rings, where a filtrate flows out of the housing though the outlet.

* * * * *